US012804584B2

(12) United States Patent
Wang et al.

(10) Patent No.: US 12,804,584 B2
(45) Date of Patent: Nov. 17, 2026

(54) POSITIONING METHOD, AND TERMINAL, AND MEDIUM

(71) Applicant: VIVO MOBILE COMMUNICATION CO., LTD., Dongguan (CN)

(72) Inventors: Yuanyuan Wang, Dongguan (CN); Huaming Wu, Dongguan (CN); Ye Si, Dongguan (CN); Zixun Zhuang, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 316 days.

(21) Appl. No.: 18/422,340

(22) Filed: Jan. 25, 2024

(65) Prior Publication Data

US 2024/0163832 A1 May 16, 2024

Related U.S. Application Data

(63) Continuation of application No. PCT/CN2022/107331, filed on Jul. 22, 2022.

(30) Foreign Application Priority Data

Jul. 26, 2021 (CN) ......................... 202110846109.7

(51) Int. Cl.
*H04W 64/00* (2009.01)

(52) U.S. Cl.
CPC .................................. *H04W 64/00* (2013.01)

(58) Field of Classification Search
CPC ....... H04W 64/00; H04W 92/18; H04W 4/46; G01S 5/02; G01S 5/0236
USPC ...................................................... 455/456.1
See application file for complete search history.

(56) References Cited

U.S. PATENT DOCUMENTS

2022/0229146 A1 7/2022 Ko et al.
2022/0279313 A1 9/2022 Huang
2022/0321294 A1 10/2022 Ren et al.
2022/0385423 A1* 12/2022 Ko ...................... H04W 52/281
2022/0393820 A1* 12/2022 Keating ................ H04W 76/14
(Continued)

FOREIGN PATENT DOCUMENTS

CN 112583553 A 3/2021
CN 112788519 A 5/2021
(Continued)

OTHER PUBLICATIONS

Satyam Dwivedi (Positioning in 5G networks); published Feb. 2021; rXiv:2102.03361v1; 7 pages. (Year: 2021).*
Extended European Search Report regarding European Patent Application No. 22848441.6, dated Nov. 12, 2024.
(Continued)

*Primary Examiner* — Hirdepal Singh
(74) *Attorney, Agent, or Firm* — Harness, Dickey & Pierce, P.L.C.

(57) ABSTRACT

A positioning method includes: A first terminal performs transmission of a target message with a target device. The first terminal performs transmission of a first SL-PRS based on the target message. The target message includes at least one of the following: a positioning request or positioning assistance data. The first SL-PRS is used for determining: location information of the first terminal and/or a second terminal, and/or SL-PRS measurement information. The second terminal is a peer terminal that performs SL communication or SL positioning with the first terminal.

20 Claims, 7 Drawing Sheets

(56) References Cited

U.S. PATENT DOCUMENTS

| | | | | |
|---|---|---|---|---|
| 2023/0050447 | A1 | 2/2023 | Ren et al. | |
| 2023/0194648 | A1 | 6/2023 | Miao et al. | |
| 2023/0224121 | A1* | 7/2023 | Ganesan | H04L 5/0048 455/456.1 |
| 2024/0056997 | A1* | 2/2024 | Hoang | H04W 64/00 |
| 2024/0129884 | A1* | 4/2024 | Manolakos | G01S 5/0072 |
| 2024/0365278 | A1* | 10/2024 | Bao | H04L 27/261 |

FOREIGN PATENT DOCUMENTS

| | | | |
|---|---|---|---|
| CN | 113055136 | A | 6/2021 |
| WO | WO-2020251318 | A1 | 12/2020 |
| WO | 2021086093 | A1 | 5/2021 |
| WO | 2021092813 | A1 | 5/2021 |
| WO | WO-2021097598 | A1 | 5/2021 |

OTHER PUBLICATIONS

"On-Demand DL-PRS," Qualcomm Incorporated, 3GPP TSG-RAN WG2 Meeting #114-e, R2-2106084, dated May 19-27, 2021.

"Enhancement for positioning," LG Electronics, 3GPP TSG RAN RAN Rel-18 workshop, RWS-210245, dated Jun. 28-Jul. 2, 2021.

"System Architecture and Solution Development; High-Accuracy Positioning for C-V2X, 5GAA Automotive Association Technical Report," XP093055441, dated Feb. 9, 2021.

"3rd Generation Partnership Project; Technical Specification Group Radio Access Network; LTE Positioning Protocol (LPP) (Release 16)," 3GPP TS 37.355 v16.5.0, dated Jun. 2021.

First Office Action regarding Chinese Patent Application No. 202110846109.7, dated Apr. 30, 2025.

International Search Report and Written Opinion of the International Searching Authority regarding International Patent Application No. PCT/CN2022/107331, dated Oct. 10, 2022. Translation provided by Bohui Intellectual Property.

* cited by examiner

POSITIONING METHOD, AND TERMINAL, AND MEDIUM

CROSS-REFERENCE TO RELATED APPLICATIONS

This application is a Bypass Continuation Application of PCT/CN2022/107331 filed on Jul. 22, 2022, which claims priority to Chinese Patent Application No. 202110846109.7 filed on Jul. 26, 2021, which are incorporated herein by reference in their entireties.

TECHNICAL FIELD

This application belongs to the field of communication technologies, and in particular relates to a positioning method, a terminal, and a medium.

BACKGROUND

At present, a terminal can be positioned by receiving a PRS sent from a network side. Configuration information of the PRS is usually determined by a gNB or determined during installation of the network side, and does not support sending and measuring of positioning reference signals between terminals.

SUMMARY

According to a first aspect, a positioning method is provided, including: A first terminal performs transmission of a target message with a target device. The first terminal performs transmission of a first SL-PRS based on the target message. The target message includes at least one of the following: a positioning request or positioning assistance data. The first SL-PRS is used for determining: location information of the first terminal and/or a second terminal, and/or SL-PRS measurement information. The second terminal is a peer terminal that performs SL communication or SL positioning with the first terminal.

According to a second aspect, a positioning apparatus is provided, including: a first transmission module, configured to perform transmission of a target message with a target device; and a second transmission module, configured to perform transmission of a first SL-PRS based on the target message. The target message includes at least one of the following: a positioning request or positioning assistance data. The first SL-PRS is used for determining: location information of the first terminal and/or a second terminal, and/or SL-PRS measurement information. The second terminal is a peer terminal that performs SL communication or SL positioning with the first terminal.

According to a third aspect, a terminal is provided. The terminal includes a processor, a memory, and a program or instructions stored in the memory and executable on the processor. When the program or the instructions are executed by the processor, steps of the method according to the first aspect are implemented.

According to a fourth aspect, a terminal is provided, including a processor and a communication interface. The communication interface is configured to perform transmission of a target message with a target device, and configured to perform transmission of a first SL-PRS based on the target message. The target message includes at least one of the following: a positioning request or positioning assistance data. The first SL-PRS is used for determining: location information of the first terminal and/or a second terminal, and/or SL-PRS measurement information. The second terminal is a peer terminal that performs SL communication or SL positioning with the first terminal.

According to a fifth aspect, a non-transitory readable storage medium is provided. The non-transitory readable storage medium stores a program or instructions. When the program or the instructions are executed by a processor, steps of the method according to the first aspect are implemented.

According to a sixth aspect, a chip is provided. The chip includes a processor and a communication interface. The communication interface is coupled to the processor, and the processor is configured to run a program or instructions, to implement the method according to the first aspect.

According to a seventh aspect, a computer program/program product is provided. The computer program/program product is stored in a non-volatile storage medium. The computer program/program product is executed by at least one processor to implement the steps of the method according to the first aspect.

DETAILED DESCRIPTION

The following clearly describes the technical solutions in embodiments of this application with reference to accompanying drawings in the embodiments of this application. Apparently, the described embodiments are merely some but not all of the embodiments of this application. All other embodiments obtained by a person of ordinary skill in the art based on the embodiments of this application shall fall within the protection scope of this application.

In the specification and claims of this application, terms "first", "second", and the like are used to distinguish similar objects, but are not used to describe a specific sequence or order. It may be understood that the terms used in such a way is interchangeable in proper circumstances, so that the embodiments of this application described herein can be implemented in other sequences than the sequence illustrated or described herein. The objects distinguished by "first" and "second" are usually of one type, and there is no limit to a number of objects, for example, a first object may be one or more than one. In addition, "and/or" in this specification and the claims represents at least one of connected objects, and a character "/" generally represents that the connected objects are in an "or" relationship.

It should be noted that the technologies described in the embodiments of this application are not limited to a long term evolution (LTE)/LTE-advanced (LTE-A) system, and may further be applied to other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. Terms "system" and "network" in the embodiments of this application are usually used interchangeably, and the technology described can be applied to the systems and radio technologies mentioned above, and can also be applied to other systems and radio technologies. In the following descriptions, a New Radio (NR) system is described for illustrative purposes, and the NR terminology is used in most of the following descriptions, but these technologies can also be applied to applications other than NR system applications, for example, a 6th Generation (6G) communication system.

Figure 1:
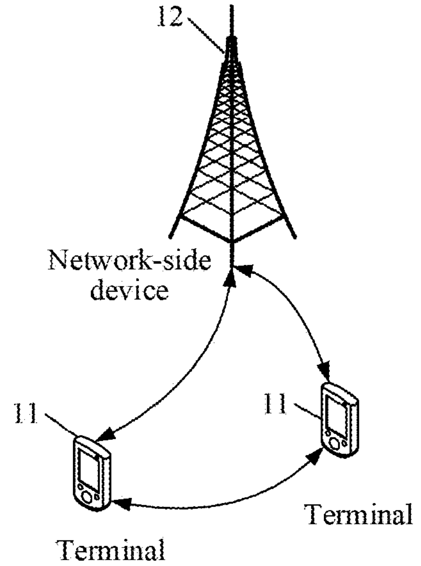
FIG. 1 is a schematic diagram of a possible architecture of a communication system according to an embodiment of this application.

FIG. 1 is a block diagram of a wireless communication system to which an embodiment of this application is applicable. The wireless communication system includes a terminal 11 and a network-side device 12. The terminal 11 may be a terminal-side device such as a mobile phone, a tablet personal computer, a laptop computer, or referred to as a notebook computer, a personal digital assistant (PDA), a palmtop computer, a netbook computer, an ultra-mobile personal computer (UMPC), a mobile Internet device (MID), an augmented reality (AR)/a virtual reality (VR) device, a robot, a wearable device, vehicle user equipment (VUE), pedestrian user equipment (PUE), or a smart household device (a household device having a wireless communication function such as a refrigerator, a television, a washing machine, or furniture). The wearable device includes a smart watch, a smart bracelet, a smart earphone, smart glasses, smart jewelry (a smart bangle, a smart wrist chain, a smart ring, a smart necklace, a smart anklet, a smart ankle chain, and the like), a smart wristband, smart clothes, a game console, and the like. It should be noted that in the embodiments of this application, a type of the terminal 11 is not limited. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission reception point (TRP), or another proper term in the art. The base station is not limited to a technical term provided that the same technical effect is achieved. It should be noted that in the embodiments of this application, the base station in the NR system is only used as an example, and a type of the base station is not limited.

In some scenarios (for example, scenarios without network coverage or without GPS coverage or without sufficient network coverage), it is possible that the terminal cannot be positioned. In some other scenarios requiring relative positioning (for example, autonomous driving and smart factories), a relative location of a terminal needs to be determined based on absolute positioning, which results in deterioration of accuracy.

A study on location service requirements of V2X has been started in R17, and current V2X has various absolute and relative positioning requirements. However, how to meet the corresponding requirements has not been defined. The embodiments of this application provide a configuration scheme for a positioning reference signal in V2X.

In a positioning method and apparatus, a device, and a medium provided in the embodiments of this application, a first terminal performs transmission of a target message (including a positioning request and/or positioning assistance data) with a target device, to enable the first terminal to flexibly perform transmission of a first SL-PRS based on the request in the target message, and determine location information of the first terminal and/or a second terminal that performs SL communication or sidelink SL positioning with the first terminal, thereby implementing positioning between the terminals and resolving a problem that positioning can only be performed under sufficient network or GPS coverage, which improves communication energy efficiency of the system.

With reference to the accompanying drawings, the positioning method provided in the embodiments of this application is described below in detail through some embodiments and application scenarios thereof.

Figure 2:
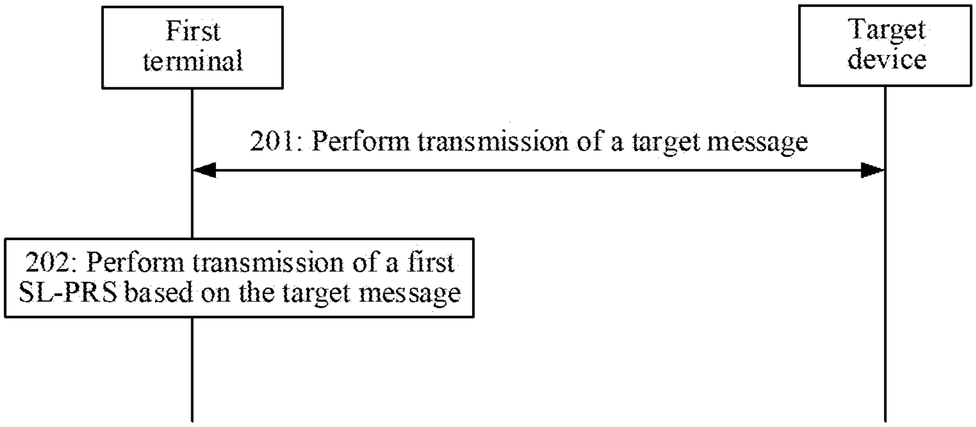
FIG. 2 is a schematic flowchart 1 of a positioning method according to an embodiment of this application.

An embodiment of this application provides a positioning method. As shown in FIG. 2, the positioning method provided in this embodiment of this application includes the following steps:

Step 201: A first terminal performs transmission of a target message based on a target device.

Step 202: The first terminal performs transmission of a first SL-PRS based on the target message.

In this embodiment of this application, the first SL-PRS is used for determining: location information of the first terminal and/or a second terminal, and/or SL-PRS measurement information. The second terminal is a peer terminal that performs SL communication or SL positioning with the first terminal.

In this embodiment of this application, the first SL-PRS may also be considered as a request-based SL-PRS.

In this embodiment of this application, the target device includes any one of the following: the second terminal, a network-side device, and a third terminal.

In an example, in a case that the target device is the second terminal, the first terminal interacts with the second terminal. That is, the first terminal is a transmit terminal, and the second terminal is a receive terminal; or the first terminal is a receive terminal, and the second terminal is a transmit terminal.

In an example, in a case that the target device is the network-side device, the first terminal interacts with the network-side device, and the first terminal is a transmit terminal, or the first terminal is a receive terminal.

In an example, the third terminal is a scheduling terminal.

In an example, in a case that the target terminal is the third terminal, the first terminal interacts with the third terminal, and if the third terminal is a scheduling terminal, the first terminal is a transmit terminal, or the first terminal is a receive terminal.

It should be noted that, in the foregoing examples, the first terminal may be both a transmit terminal and a receive terminal. For example, the first terminal serves as a receive terminal to receive the target message, and serves as a transmit terminal to send the SL-PRS. Alternatively, the first terminal serves as a receive terminal to receive the target message (for example, the positioning assistance data), and serves as a transmit terminal to send the target message (for example, the positioning request). Alternatively, for the target device, the first terminal may be regarded as a receive terminal, and for the second terminal, the first terminal may be regarded as a transmit terminal.

Optionally, in this embodiment of this application, step 202 may include the following step 202*a:*

Step 202*a*: The first terminal performs transmission of the first SL-PRS and a Uu interface positioning reference signal based on the target message.

Optionally, in this embodiment of this application, the target message includes at least one of the following: the positioning request, the positioning assistance data, location reporting or feedback information, SL-PRS measurement reporting or feedback information, a positioning response, or capability information.

It should be noted that a "measurement request" mentioned in this embodiment of this application may be considered as an SL-PRS measurement request, "feedback indication information for a measurement request" may be considered as feedback indication information for the SL-PRS measurement request, and a "signal measurement request" may be considered as a signal measurement request for an SL-PRS.

Optionally, in this embodiment of this application, the positioning request includes at least one of the following:

a positioning assistance data request,
a measurement request,
a location information reporting or feedback request,
an SL-PRS measurement reporting or feedback request,
a configuration request for at least one SL-PRS,
SL-PRS request indication information, or
feedback indication information for a measurement request.

The positioning assistance data request is used for requesting the positioning assistance data.

The measurement request is used for requesting a device to measure the first SL-PRS.

The location information reporting or feedback request is used for: requesting a device to report or feed back a resource of location information, or requesting a device to report or feed back the location information.

The SL-PRS measurement reporting or feedback request is used for: requesting a device to report or feed back a resource of SL-PRS measurement information, or requesting a device to report or feed back the SL-PRS measurement information.

The configuration request is used for requesting configuration or transmission of the at least one SL-PRS.

The SL-PRS request indication information is used to indicate whether to request for an SL-PRS.

The feedback indication information for a measurement request is used to indicate that the first SL-PRS is received, and/or indicate whether the device requested by the measurement request sends feedback information. The feedback information includes at least one of the following: the location information, SL-PRS measurement information, or hybrid automatic repeat request HARQ information.

Optionally, in this embodiment of this application, the positioning assistance data request includes at least one of the following:

recognition information of a first target terminal,
recognition information of a second target terminal,
location information of a second target terminal,
a region identifier,
a communication range,
a positioning range,
quality of service QoS information related to positioning,
a resource request used for requesting transmission of a time-frequency resource of the first SL-PRS,
a configuration request for at least one SL-PRS,
a location information reporting or feedback request,
an SL-PRS measurement reporting or feedback request,
expected angle of departure AOD information, or
expected angle of arrival AOA information.

The first target terminal is any one of the following: the first terminal, the second terminal, and a third terminal. The second target terminal is any one of the following: the first terminal, the second terminal, and the third terminal.

For example, identification information of the target terminal (that is, the first target terminal and/or the second target terminal) includes at least one of the following: user identification information of one or more terminals, user group identification information of one or more terminals, user time information of one or more terminals, user time resource information of one or more terminals, scrambling information, CRC information, information about a hosting environment, a beacon ID, floor information, information carrying resource identification of a sequence or a resource set ID of the sequence, or information such as a latitude, a longitude, and an altitude.

Optionally, in this embodiment of this application, the measurement request includes at least one of the following:

a positioning type request (for example, UE-based and UE-assisted),
frequency band information (for example, licensed, Unlicensed, FR1, or FR2),
a positioning method request (for example, sidelink based or sidelink+uu (for example, uu based and sidelink assisted, or sidelink based and uu assisted)),
a location information type (for example, location information (for example, absolute location information and relative location information) and measurement information),
a signal measurement request,
priority information of measurement of an SL-PRS,
priority information of transmission of the SL-PRS,
expected angle of departure AOD information, or
expected angle of arrival AOA information.

Optionally, in this embodiment of this application, the positioning request includes at least one of the following:

information about at least one SL-PRS configuration set,
first SL-PRS configuration information, or
second SL-PRS configuration information.

The second SL-PRS configuration information is configuration information of an SL-PRS expected by the first terminal and/or the second terminal; and the first SL-PRS configuration information may be understood as conventional SL-PRS configuration information.

In an example, the information about the at least one SL-PRS configuration set includes at least one of the following:

identification information of at least one SL-PRS configuration set, or a configuration parameter of an SL-PRS in the at least one SL-PRS configuration set.

It should be noted that the configuration parameter of the SL-PRS in the at least one SL-PRS configuration set may include configuration parameters of the SL-PRS in all or some SL-PRS configuration sets of the at least one SL-PRS configuration set. The configuration parameter of the SL-PRS of each SL-PRS configuration set may include all or some configuration parameters of the SL-PRS in the SL-PRS configuration set.

In an example, in this embodiment of this application, all the configuration parameters of the SL-PRS in the SL-PRS configuration sets may include conventional SL-PRS configuration information (that is, the first SL-PRS configuration information in this application).

Optionally, in this embodiment of this application, the first SL-PRS configuration information or the configuration parameter of the SL-PRS includes at least one of the following:

the configuration parameter of the SL-PRS (SL-PRS Configuration Parameter);

a maximum number of frequency layers of the SL-PRS;

positioning frequency layer information of the SL-PRS (SL-PRS Positioning Frequency Layer Information);

a subcarrier spacing of the SL-PRS (SL-PRS Subcarrier Spacing);

a resource bandwidth of the SL-PRS (SL-PRS Resource Bandwidth);

a start point of a physical resource block PRB of the SL-PRS (SL-PRS Start PRB);

a frequency domain position start point of the SL-PRS (SL-PRS PointA);

a comb size N of the SL-PRS (SL-PRS Comb Size N);

a cyclic prefix of the SL-PRS (SL-PRS Cyclic Prefix);

an SL-PRS configuration of each frequency layer (SL-PRS Configuration per Frequency Layer);

identification information of the SL-PRS;

physical cell identifier PCI of the SL-PRS;

an absolute radio frequency channel number (ARFCN);

a cell global identifier (NR Cell Global Identity, NCGI);

a maximum number of resource sets of the SL-PRS (Maximum Number of SL-PRS Resource Sets);

resource set information of the SL-PRS (SL-PRS Resource Set Information);

a resource set identifier of the SL-PRS (SL-PRS Resource Set ID);

a periodicity and resource set slot offset of the SL-PRS (SL-PRS Periodicity and Resource Set Slot Offset);

a resource repetition factor of the SL-PRS (SL-PRS Resource Repetition Factor);

a resource time gap of the SL-PRS (SL-PRS Resource Time Gap);

a number of symbols of the SL-PRS (SL-PRS Number of Symbols);

a first muting option of the SL-PRS (SL-PRS Muting Option 1);

a second muting option of the SL-PRS (SL-PRS Muting Option 2);

resource power information of the SL-PRS (SL-PRS Resource Power);

a maximum number of SL-PRS resources included in each SL-PRS resource set in at least one SL-PRS resource set (Maximum Number of SL-PRS Resources per Set);

resource information of the SL-PRS (SL-PRS Resource Information);

a resource identifier of the SL-PRS (SL-PRS Resource ID);

a sequence identifier of the SL-PRS (SL-PRS Sequence ID);

an resource element RE offset of the SL-PRS (SL-PRS RE Offset);

a resource slot offset of the SL-PRS (SL-PRS Resource Slot Offset); or a resource symbol offset of the SL-PRS (SL-PRS Resource Symbol Off).

Optionally, in this embodiment of this application, the at least one SL-PRS configuration set includes a target SL-PRS configuration set. The target SL-PRS configuration set includes a configuration of at least one target SL-PRS. The first SL-PRS is one or more SL-PRSs in the at least one target SL-PRS.

In an example, the target SL-PRS configuration set includes at least one of the following:

identification information (for example, sl-PRS-Config-Index) of the target SL-PRS configuration set, location information of a second target terminal, priority information of measurement of a target SL-PRS, priority information of transmission of the target SL-PRS, expected angle of departure AOD information, expected angle of arrival AOA information, or a configuration parameter of the target SL-PRS in the target SL-PRS configuration set.

Optionally, in this embodiment of this application, in a case that an SL-PRS configuration received by the first terminal does not meet a positioning requirement of the first terminal and/or the second terminal, or an SL-PRS configuration received by the first terminal does not include the target SL-PRS, the positioning request includes: at least one SL-PRS configuration set used for selection on demand. The at least one SL-PRS configuration set includes a configuration of at least one SL-PRS. The first SL-PRS is one or more SL-PRSs in the at least one target SL-PRS.

The configuration parameter of the target SL-PRS may include at least one of the following:

the configuration parameter of the target SL-PRS (SL-PRS Configuration Parameter);

a maximum number of frequency layers of the target SL-PRS (Maximum Number of Frequency Layers);

positioning frequency layer information of the target SL-PRS (SL-PRS Positioning Frequency Layer Information);

a subcarrier spacing of the target SL-PRS (SL-PRS Subcarrier Spacing);

a resource bandwidth of the target SL-PRS (SL-PRS Resource Bandwidth);

a start point of a PRB of the target SL-PRS (SL-PRS Start PRB);

a frequency domain position start point of the target SL-PRS (SL-PRS PointA);

a comb size N of the target SL-PRS (SL-PRS Comb Size N);

a cyclic prefix of the target SL-PRS (SL-PRS Cyclic Prefix);

a target SL-PRS configuration of each frequency layer (SL-PRS Configuration per Frequency Layer);

identification information of the target SL-PRS;

PCI of the target SL-PRS;
an absolute radio frequency channel number (ARFCN);
a cell global identifier (NR Cell Global Identity, NCGI);
a maximum number of resource sets of the target SL-PRS (Maximum Number of SL-PRS Resource Sets);
resource set information of the target SL-PRS (SL-PRS Resource Set Information);
a resource set identifier of the target SL-PRS (SL-PRS Resource Set ID);
a periodicity and resource set slot offset of the target SL-PRS (SL-PRS Periodicity and Resource Set Slot Offset);
a resource repetition factor of the target SL-PRS (SL-PRS Resource Repetition Factor);
a resource time gap of the target SL-PRS (SL-PRS Resource Time Gap);
a number of symbols of the target SL-PRS (SL-PRS Number of Symbols);
a first muting option of the target SL-PRS (SL-PRS Muting Option 1);
a second muting option of the target SL-PRS (SL-PRS Muting Option 2);
resource power information of the target SL-PRS (SL-PRS Resource Power);
a maximum number of target SL-PRS resources included in each target SL-PRS resource set in at least one target SL-PRS resource set (Maximum Number of SL-PRS Resources per Set);
resource information of the target SL-PRS (SL-PRS Resource Information);
a resource identifier of the target SL-PRS (SL-PRS Resource ID);
a sequence identifier of the target SL-PRS (SL-PRS Sequence ID);
an RE offset of the target SL-PRS (SL-PRS RE Offset);
a resource slot offset of the target SL-PRS (SL-PRS Resource Slot Offset); or
a resource symbol offset of the target SL-PRS (SL-PRS Resource Symbol Off).

It should be noted that the configuration parameter of the target SL-PRS may be the same as or different from the configuration parameter in the at least one SL-PRS configuration set.

Optionally, in this embodiment of this application, the second SL-PRS configuration information includes at least one of the following:

bandwidth information of the SL-PRS;
a sending start time of the SL-PRS;
a sending end time of the SL-PRS;
sending duration of the SL-PRS;
measurement window information of the SL-PRS;
configuration window information used for configuring the SL-PRS;
a number of combs configured for the SL-PRS;
a number of symbols of the SL-PRS;
a target terminal set;
a number of target terminals;
identification information of a target terminal;
a set of selected SL-PRSs;
a resource of the selected SL-PRSs;
identification information of the selected SL-PRSs;
a resource set of the selected SL-PRSs;
a number of the selected SL-PRSs;
a bandwidth of the selected SL-PRSs; or
a dedicated resource set of the selected SL-PRSs.

It should be noted that the selected SL-PRS may be an SL-PRS selected by the first terminal or the target device. For example, a plurality of SL-PRS sets or SL-PRS resources are configured for the first terminal or the target device, and the first terminal or the target device selects at least one SL-PRS or SL-PRS resource to determine the location information of the first terminal and/or the second terminal.

Optionally, in this embodiment of this application, the first SL-PRS configuration information includes a configuration parameter of a dedicated resource. Transmission of the first SL-PRS is performed based on the dedicated resource. The dedicated resource includes at least one of the following: a resource dedicated to scheduling of the SL-PRS or a resource dedicated to transmission of the SL-PRS.

It should be noted that the selected SL-PRS may be an SL-PRS selected by the first terminal or the target device. For example, a plurality of dedicated resources are configured for the first terminal or the target device to perform transmission of the SL-PRS, and the first terminal or the target device selects at least one dedicated resource to determine the location information of the first terminal and/or the second terminal.

For example, the configuration parameter of the dedicated resource includes at least one of the following:

bandwidth information (for example, 100 M, for example, N subchannels) of the dedicated resource;
a frequency domain position start point (point A) of the dedicated resource;
information about a start resource block RB of the dedicated resource;
numerology information of the dedicated resource;
a subcarrier spacing of the dedicated resource;
a cyclic prefix CP of the dedicated resource;
a start time (for example, a start symbol and a start slot) of the dedicated resource;
an end time (for example, an end symbol and an end slot) of the dedicated resource;
duration (for example, symbol duration and slot duration) of the dedicated resource; or
pool information of the dedicated resource.

Optionally, in this embodiment of this application, the positioning request includes at least one of the following:

a positioning assistance data request and/or a Uu interface positioning assistance data request;
a measurement request and/or a Uu interface signal measurement request;
a location information reporting or feedback request, and/or a Uu interface location information reporting or feedback request;
at least one SL-PRS configuration set, and/or at least one downlink sounding reference signal SRS configuration set, and/or at least one uplink SRS configuration set; or
an SL-PRS measurement reporting or feedback request and/or a Uu interface measurement reporting or feedback request.

It should be noted that the "and" situation in each of the foregoing positioning request is used for SL+Uu positioning, that is, used for a scenario of SL-assisted Uu-based positioning, or used for a scenario of Uu-assisted SL-based positioning.

Optionally, in this embodiment of this application, the positioning assistance data includes at least one of the following:

a time-frequency resource for sending an SL-PRS,
a time-frequency resource for reporting or feeding back SL-PRS measurement,
a time-frequency resource for reporting or feeding back location information, the time-frequency resource for reporting or feeding back the SL-PRS measurement, at least one SL-PRS configuration set, identification information of at least one SL-PRS configuration set, a configuration parameter of the SL-PRS in each SL-PRS configuration set, recognition information of a first target terminal, recognition information of a second target terminal, a region identifier, a communication range, a positioning range, quality of service QoS information related to positioning, priority information of measurement of a target SL-PRS, or priority information of transmission of the target SL-PRS.

The first target terminal is any one of the following: the first terminal, the second terminal, and a third terminal. The second target terminal is any one of the following: the first terminal, the second terminal, and the third terminal.

For example, the time-frequency resource for sending the SL-PRS may be understood as first dedicated resource indication information, for example, may be that a network side reserves N first dedicated resources for sending the first SL-PRS.

For example, the identification information of the at least one SL-PRS configuration set may be understood as that the network side reserves N SL-PRS configuration sets for sending the first SL-PRS.

The configuration parameter of the SL-PRS in each SL-PRS configuration set includes at least one of the following:

the configuration parameter of the SL-PRS (SL-PRS Configuration Parameter);

a maximum number of frequency layers of the SL-PRS;

positioning frequency layer information of the SL-PRS (SL-PRS Positioning Frequency Layer Information);

a subcarrier spacing of the SL-PRS (SL-PRS Subcarrier Spacing);

a resource bandwidth of the SL-PRS (SL-PRS Resource Bandwidth);

a start point of a PRB of the SL-PRS (SL-PRS Start PRB);

a frequency domain position start point of the SL-PRS (SL-PRS PointA);

a comb size N of the SL-PRS (SL-PRS Comb Size N);

a cyclic prefix of the SL-PRS (SL-PRS Cyclic Prefix);

an SL-PRS configuration of each frequency layer (SL-PRS Configuration per Frequency Layer);

identification information of the SL-PRS;

PCI of the SL-PRS;

an absolute radio frequency channel number (ARFCN);

a cell global identifier (NR Cell Global Identity, NCGI);

a maximum number of resource sets of the SL-PRS (Maximum Number of SL-PRS Resource Sets);

resource set information of the SL-PRS (SL-PRS Resource Set Information);

a resource set identifier of the SL-PRS (SL-PRS Resource Set ID);

a periodicity and resource set slot offset of the SL-PRS (SL-PRS Periodicity and Resource Set Slot Offset);

a resource repetition factor of the SL-PRS (SL-PRS Resource Repetition Factor);

a resource time gap of the SL-PRS (SL-PRS Resource Time Gap);

a number of symbols of the SL-PRS (SL-PRS Number of Symbols);

a first muting option of the SL-PRS (SL-PRS Muting Option 1);

a second muting option of the SL-PRS (SL-PRS Muting Option 2);

resource power information of the SL-PRS (SL-PRS Resource Power);

a maximum number of SL-PRS resources included in each SL-PRS resource set in at least one SL-PRS resource set (Maximum Number of SL-PRS Resources per Set);

resource information of the SL-PRS (SL-PRS Resource Information);

a resource identifier of the SL-PRS (SL-PRS Resource ID);

a sequence identifier of the SL-PRS (SL-PRS Sequence ID);

an RE offset of the SL-PRS (SL-PRS RE Offset);

a resource slot offset of the SL-PRS (SL-PRS Resource Slot Offset); or a resource symbol offset of the SL-PRS (SL-PRS Resource Symbol Off).

Optionally, in this embodiment of this application, the positioning assistance data includes positioning assistance data of at least one target terminal. The positioning assistance data further includes at least one of the following:

location information of the at least one target terminal;

SL-PRS measurement information of the at least one target terminal, type information of the at least one target terminal;

expected angle of departure AOD information corresponding to a target terminal, or expected angle of arrival AOA information corresponding to the target terminal.

For example, the location information includes at least one of the following: absolute location information, relative location information, trajectory information, path information, speed information, or acceleration information. The SL-PRS measurement information includes at least one of the following: reference signal received power RSRP measurement information, reference signal time difference measurement information, receive-transmit time difference measurement information, arrival time measurement information, reference signal recognition information, reference signal received power information, angle measurement information, or transmission reception point identification information. The type information is used to indicate any one of the following: whether the target terminal supports the SL-PRS, or whether the target terminal supports an SL positioning method, or whether the target terminal is indicated as a road side unit RSU device, and whether the target terminal is a terminal of a type or a common terminal.

Optionally, in this embodiment of this application, the positioning assistance data of the at least one target terminal includes at least one of the following SL-PRS information corresponding to the target terminal:

a time-frequency resource for sending an SL-PRS, a time-frequency resource for reporting or feeding back SL-PRS measurement, a time-frequency resource for reporting or feeding back location information, at least one SL-PRS configuration set;

identification information of at least one SL-PRS configuration set, priority information of measurement and/or transmission of the SL-PRS, expected angle of departure AOD information of transmission or measurement of the SL-RPS, expected angle of arrival AOA information of transmission or measurement of the SL-RPS, or a configuration parameter of the SL-PRS in at least one SL-PRS configuration set.

Optionally, in this embodiment of this application, the SL-PRS measurement reporting or feedback information includes at least one of the following:

recognition information of a first target terminal, recognition information of a second target terminal, location information of a second target terminal, or SL-PRS measurement information.

For example, the SL-PRS measurement information includes at least one of the following: reference signal received power RSRP measurement information, reference signal time difference measurement information, receive-transmit time difference measurement information, arrival time measurement information, reference signal recognition information, reference signal received power information, angle measurement information, or transmission reception point identification information. The location information includes at least one of the following: absolute location information, relative location information, trajectory information, path information, speed information, or acceleration information. The first target terminal is any one of the following: the first terminal, the second terminal, and a third terminal. The second target terminal is any one of the following: the first terminal, the second terminal, and the third terminal.

Optionally, in this embodiment of this application, the positioning response includes at least one of the following:

error indication information, error type information, no available resource information, error cause information, acknowledgment ACK information, negative acknowledgment NACK information, information of not supporting on-demand selection of a PRS, identification information of at least one SL-PRS configuration set, request success indication information or request failure indication information, configuration success indication information or configuration failure indication information, a configuration parameter of an SL-PRS in the at least one SL-PRS configuration set, recognition information of a first target terminal, recognition information of a second target terminal, a region identifier, a communication range, a positioning range, QoS information related to positioning, a time-frequency resource for sending the SL-PRS, or a time-frequency resource for reporting or feeding back SL-PRS measurement.

The first target terminal is any one of the following: the first terminal, the second terminal, and a third terminal. The second target terminal is any one of the following: the first terminal, the second terminal, and the third terminal.

Optionally, in this embodiment of this application, the capability information includes at least one of the following:

a capability of processing an SL-PRS; or a capability (for example, a capability such as RTT, TOA, TDOA, or AOA) of an SL positioning method.

For example, the capability of processing the SL-PRS includes at least one of the following: a capability of simultaneously processing the SL-PRS and a downlink DL PRS, a capability of simultaneously processing the SL-PRS and a uplink UL PRS, an SL-PRS buffer type (for example, a type 1 or a type 2, respectively used for a symbol-level or slot-level buffer), a frequency band supported by the SL-PRS, a number of frequency bands supported by the SL-PRS, a capability of supporting carrier aggregation, a maximum capability of processing the SL-PRS, duration of the SL-PRS, or a number of sent SL-PRSs. The capability of the SL positioning method includes at least one of the following: an SL-PRS measurement capability, a positioning mode (for example, UE-ASSISTED, ue-based, ue configure, or network configure), a multi-beam sending or measurement capability, quasi-co-location QCL, a capability of a path loss reference signal, a capability of supporting multi-path measurement or reporting, or a capability of supporting first-path measurement or reporting. The SL-PRS measurement capability includes at least one of the following: a maximum number of measured transmit terminals or a number of measured frequency layers.

Optionally, in this embodiment of this application, the target message includes any one of the following:

indication information indicating in-coverage; and indication information indicating out-of-coverage.

"In-coverage" may be understood as "being in network coverage" or may be understood as "being in GPS and GNSS coverage". There may be different indication information in coverage, for example, in-network coverage. The in-network coverage, for another example, may be in full coverage or partial coverage. The so-called partial coverage may be understood as that in this area, some terminals are in network coverage and some terminals are out of network coverage.

Optionally, in this embodiment of this application, in a case that the target device is the network-side device, transmission of the target message is performed through one or more of the following messages:

dynamic grant information (for example, Dynamic grant DCI 3_X), configured grant information (for example, Configured grant type-1 and type-2), a long term evolution positioning protocol LPP message, an radio resource control RRC message, and a medium access control-control element MAC CE message.

Optionally, in this embodiment of this application, in a case that the target device is the second terminal or the third terminal, transmission of the target message is performed through one or more of the following messages:

sidelink control information SCI;

a physical sidelink shared channel PSSCH;

a proximity communication long term evolution positioning protocol PC5-LPP message; and a proximity communication radio resource control PC5-RRC message.

Optionally, in this embodiment of this application, the target message includes time domain offset information.

the time domain offset information includes at least one of the following:

offset information between SL-PRS measurement reporting or feedback and an SL-PRS;

offset information between location information reporting or feedback and the SL-PRS;

offset information between the positioning request and the SL-PRS;

offset information between the positioning request and the SL-PRS measurement reporting or feedback;

offset information between the SCI and the SL-PRS;

offset information between the SCI and the SL-PRS measurement reporting or feedback;

offset information between the SCI and the location information reporting or feedback; or offset information between the SCI and the positioning request.

For example, the SCI includes at least one of the following: first stage SCI, second stage SCI, or third SCI. The third SCI is dedicated to scheduling of an SL-PRS.

Figure 3:
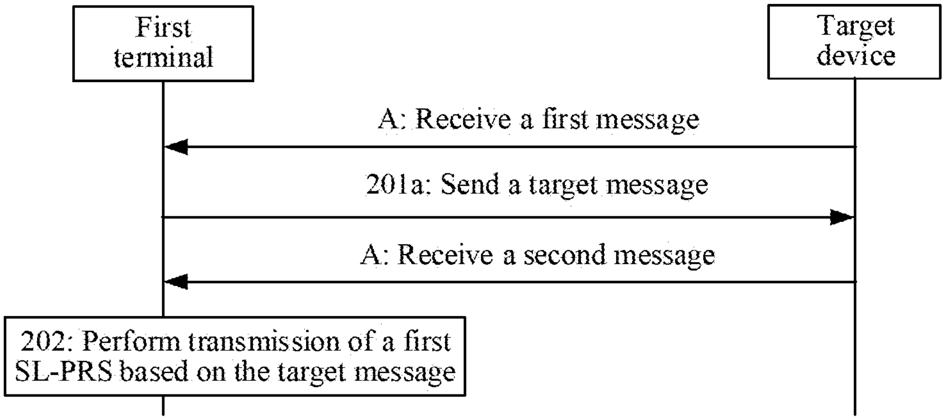
FIG. 3 is a schematic flowchart 2 of a positioning method according to an embodiment of this application.

Optionally, in this embodiment of this application, as shown in FIG. 3, step 201 may include the following step 201*a:*

Step 201*a*: The first terminal sends the target message to the target device.

Based on step 201*a*, the positioning method provided in this embodiment of this application further includes:

Step A: The first terminal receives a first message before sending the target message; and/or the first terminal receives a second message after sending the target message.

For example, the first message includes at least one of the following: the positioning request, the positioning assistance data, SL-PRS measurement reporting or feedback information, a positioning response, or capability information. The second message includes at least one of the following: the positioning request, the positioning assistance data, SL-PRS measurement reporting or feedback information, a positioning response, or capability information.

In a possible example, the target message includes the positioning request. The first message includes the positioning assistance data or the positioning response. The second message includes configuration information of a target SL-PRS or activation information of the target SL-PRS.

Figure 4:
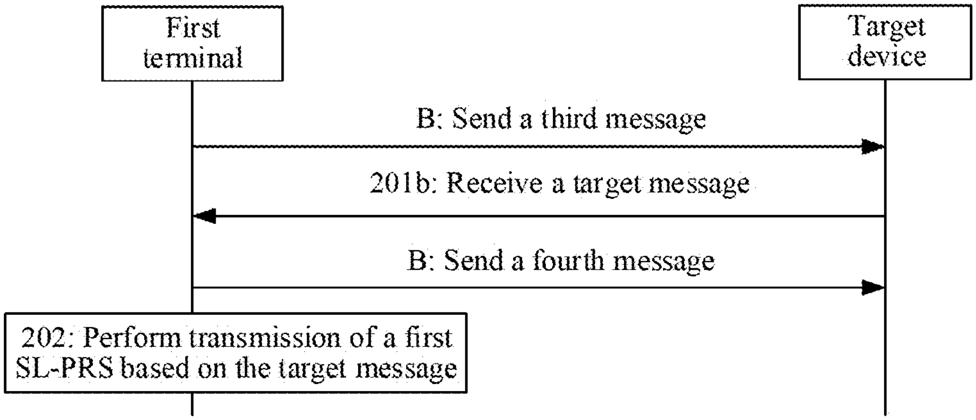
FIG. 4 is a schematic flowchart 3 of a positioning method according to an embodiment of this application.

Optionally, in this embodiment of this application, as shown in FIG. 4, step 201 may include the following step 201*b:*

Step 201*b*: The first terminal receives the target message from the target device.

Based on step 201*b*, the positioning method provided in this embodiment of this application further includes:

Step B: The first terminal sends a third message before receiving the target message; and/or the first terminal receives a fourth message after receiving the target message.

For example, the third message includes at least one of the following: the positioning request, the positioning assistance data, SL-PRS measurement reporting or feedback information, a positioning response, or capability information. The fourth message includes at least one of the following: the positioning request, the positioning assistance data, SL-PRS measurement reporting or feedback information, a positioning response, or capability information.

In a possible example, the target message includes the positioning request. The third message includes the positioning assistance data. The fourth message includes a positioning response. In a case that the positioning request includes an SL-PRS measurement or reporting request, the positioning response includes a time-frequency resource for reporting or feeding back SL-PRS measurement of the SL-PRS. In a case that the positioning request includes a location information reporting or feedback request, the positioning response includes location information of a target terminal. The target terminal includes at least one of the following: the first terminal, the second terminal, or the third terminal.

The positioning method provided in the embodiments of this application is illustratively described by using several examples.

Embodiment 1

Figure 5:
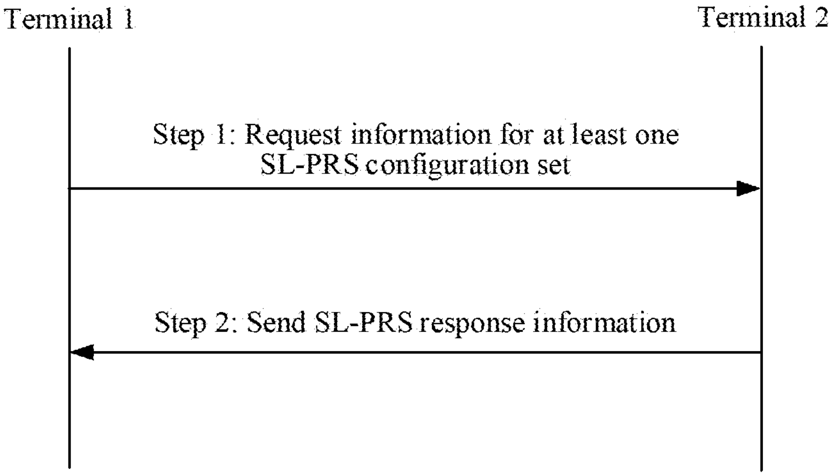
FIG. 5 is a schematic flowchart 4 of a positioning method according to an embodiment of this application.

As shown in FIG. 5, an example in which Target UE interacts with anchor UE is used.

It should be noted that the Target UE and the anchor UE are descriptions of the first terminal and the second terminal. An example in which the Target UE is a terminal 1, and the anchor UE is a terminal 2 is used for illustrative descriptions in FIG. 5 to FIG. 14.

Step 1: The Target UE sends request information for at least one SL-PRS configuration set to the anchor UE.

For example, the request information for at least one SL-PRS configuration set may include a positioning request. The positioning request may include: at least one SL-PRS configuration, and/or a configuration of a resource for reporting or feeding back location information, and/or a configuration of a resource for reporting or feeding back SL-PRS measurement information. The positioning request may also include a requested positioning type (for example, absolute or relative) and a positioning method (RTT, TDOA, AOA, AOD, or the like).

For example, the anchor UE (for example, an RSU or a leader in a vehicle platoon) is configured to: receive the positioning request, and/or configure the SL-PRS, and/or calculate a location of UE. The Target UE may be understood as the first terminal.

Step 2: The anchor UE sends response information of the SL-PRS.

For example, the response information may be a positioning response. The positioning response may include: ACK, or a configuration of a target SL-PRS, or a configuration of a resource for reporting or feeding back target location information.

In addition, the anchor UE sends the target SL-PRS, the Target UE measures the SL-PRS, and the Target UE reports or feeds back measurement information.

Embodiment 2

Figure 6:
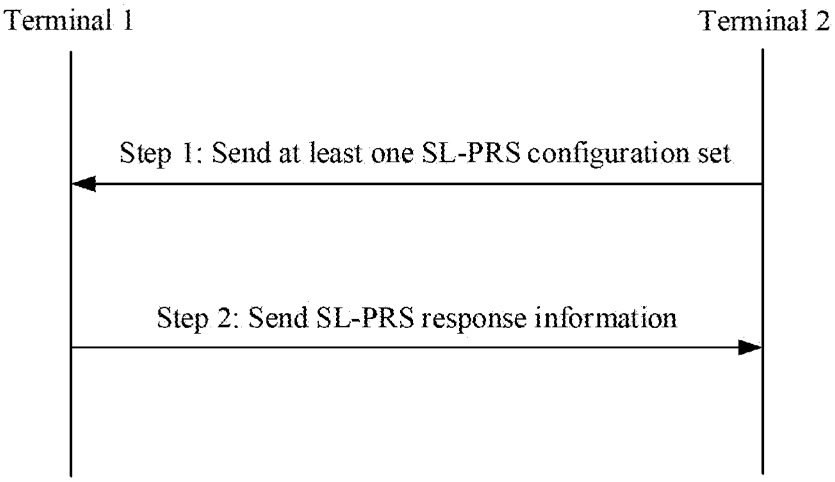
FIG. 6 is a schematic flowchart 5 of a positioning method according to an embodiment of this application.

As shown in FIG. 6, an example in which Target UE interacts with anchor UE is used.

Step 1: The anchor UE sends at least one SL-PRS configuration set to the Target UE.

For example, SL-PRS configuration information of the at least one SL-PRS configuration set may include positioning assistance data. The positioning assistance data may include at least one SL-PRS configuration set and/or a configuration of a resource for reporting or feeding back location information or measurement information.

For example, the SL-PRS configuration information of the at least one SL-PRS configuration set may be a configuration of a target SL-PRS and a configuration of a target feedback resource.

Step 2: The Target UE sends response information of the SL-PRS to the anchor UE.

For example, the response information may include a positioning response or a positioning request. The positioning response or the positioning request may include: ack, or the configuration of the target SL-PRS, or a configuration of a resource for reporting or feeding back location information or SL-PRS measurement, or the like.

In addition, the anchor UE sends the target SL-PRS, the Target UE measures the target SL-PRS, and the Target UE reports or feeds back the measurement information or the location information.

Embodiment 3

Figure 7:
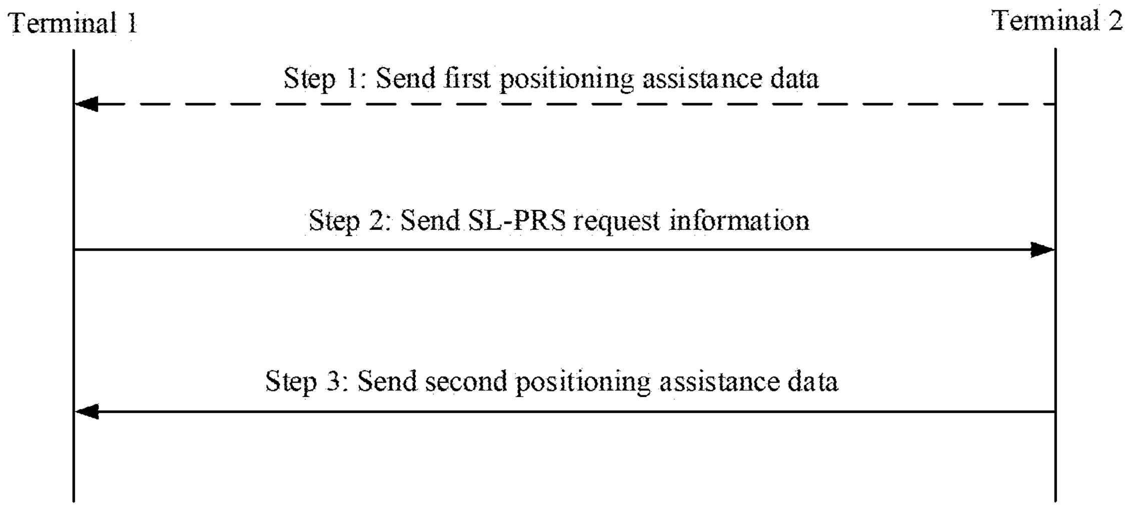
FIG. 7 is a schematic flowchart 6 of a positioning method according to an embodiment of this application.

As shown in FIG. 7, an example in which Target UE interacts with anchor UE is used.

Step 1: The anchor UE sends first positioning assistance data to the Target UE.

For example, the first positioning assistance data may include at least one of the following:

at least one SL-PRS configuration set;

first SL-PRS configuration information;

a configuration of a resource for reporting or feeding back location information or SL-PRS measurement;

identification information of the anchor UE; or location information of the anchor UE and the like.

Step 2: The Target UE sends SL-PRS request information to the anchor UE.

For example, the SL-PRS request information may include the positioning request.

For example, the positioning request may include at least one of the following: ack;

a configuration of at least one SL-PRS set;

second SL-PRS configuration information;

a configuration of a resource for reporting or feeding back location information or SL-PRS measurement;

identification information of the anchor UE;

location information of the anchor UE and the like; or a configuration of an SL-PRS or a configuration of a feedback resource.

Optionally, there may be only one of step 1 and step 2.

Step 3: The anchor UE sends second positioning assistance data to the Target UE.

For example, the second positioning assistance data may include a configuration of a target SL-PRS, and/or the configuration of the resource for reporting or feeding back the location information or the SL-PRS measurement In addition, the anchor UE sends the target SL-PRS, the Target UE measures the target SL-PRS, and the Target UE reports or feeds back the measurement information.

It should be noted that in Embodiment 1 to Embodiment 3, the target UE may alternatively be a terminal sending the SL-PRS, and at the same time, the anchor UE is a terminal that reports or feeds back the location information or the SL-PRS measurement. In addition, in an embodiment scenario, the target UE may alternatively be a terminal sending the SL-PRS, the anchor UE is a terminal that feeds back the location information or the measurement information to the target UE or scheduling UE, and the target UE or the scheduling UE reports the location information or the measurement information to the network side.

Embodiment 4

Figure 8:
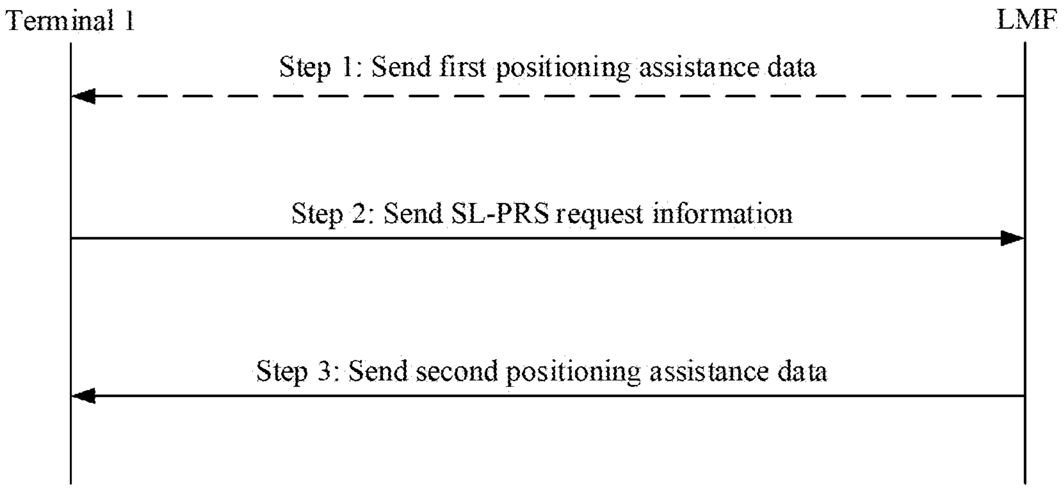
FIG. 8 is a schematic flowchart 7 of a positioning method according to an embodiment of this application.

As shown in FIG. 8, an example in which Target UE interacts with scheduling UE or a network-side device (the network-side device is used as an example in FIG. 8, and an LMF is used as an example for illustrative description) is used.

Step 1: The scheduling UE or the network-side device sends first positioning assistance data to the Target UE.

For example, the first positioning assistance data may include a configuration of a first SL-PRS and a configuration of a feedback resource.

Step 2: The Target UE sends SL-PRS request information to the scheduling UE or the network-side device.

For example, the SL-PRS request information may be a positioning request. The positioning request includes: ack or a configuration of an SL-PRS or the configuration of the feedback resource.

Step 3: The scheduling UE or the network-side device sends second positioning assistance data to the Target UE.

For example, the second positioning assistance data may include a configuration of a first target SL-PRS and the configuration of the feedback resource.

Subsequently, the anchor UE may further send third positioning assistance data to the Target UE.

For example, the third positioning assistance data may include a configuration of a second target SL-PRS or the configuration of the feedback resource.

In addition, the anchor UE send the second target SL-PRS, the Target UE measures the target SL-PRS, and the Target UE reports or feeds back measurement information.

Figure 9:
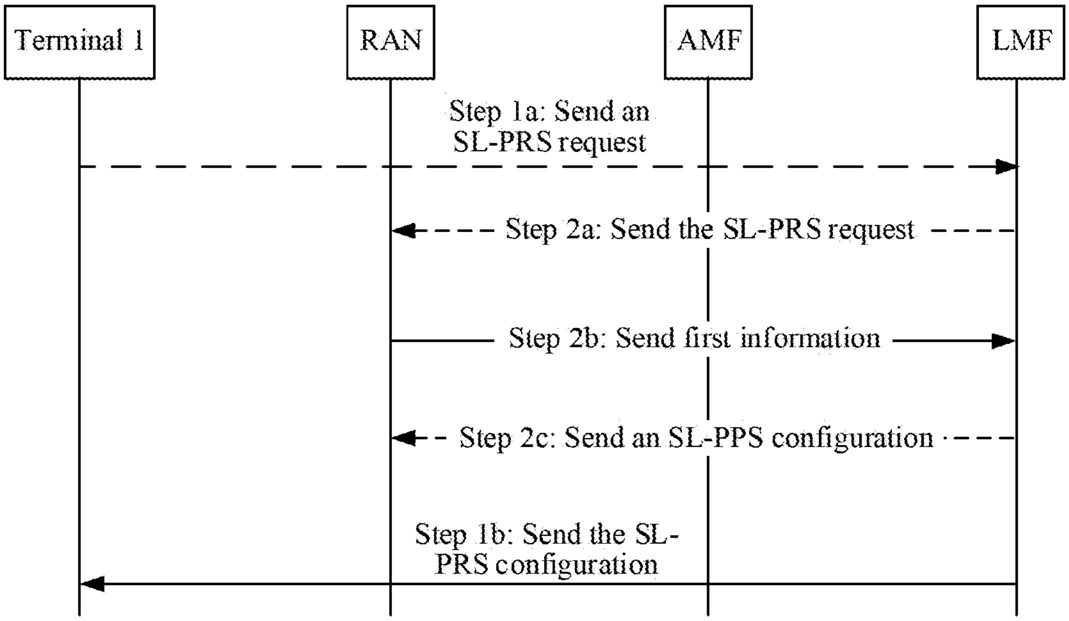
FIG. 9 is a schematic flowchart 8 of a positioning method according to an embodiment of this application.

Embodiment 5 (as shown in FIG. 9):

Step 1*a*: UE sends an SL-PRS request to an LMF.

Step 2*a*: The LMF sends the SL-PRS request to a RAN.

Step 2*b*: The RAN sends first information to a LAM, where the first information carries an SL-PRS response corresponding to the SL-PRS request.

Step 2*c*: The LAM sends SL-PRS configuration information to the RAN.

Step 1*b*: The LAM sends the SL-PRS configuration information to a terminal 1.

Figure 10:
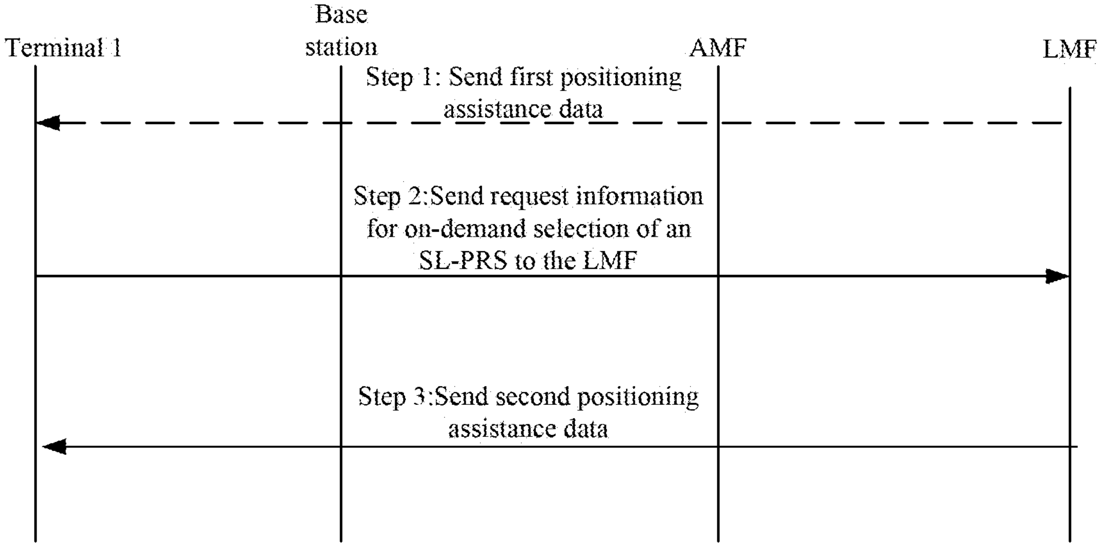
FIG. 10 is a schematic flowchart 9 of a positioning method according to an embodiment of this application.

Embodiment 6 (as shown in FIG. 10):

Step 1: An LMF sends first positioning assistance data to a terminal 1.

Step 2: The terminal 1 sends request information for on-demand selection of an SL-PRS to the LMF.

Step 3: The LMF sends second positioning assistance data to the terminal 1.

Figure 11:
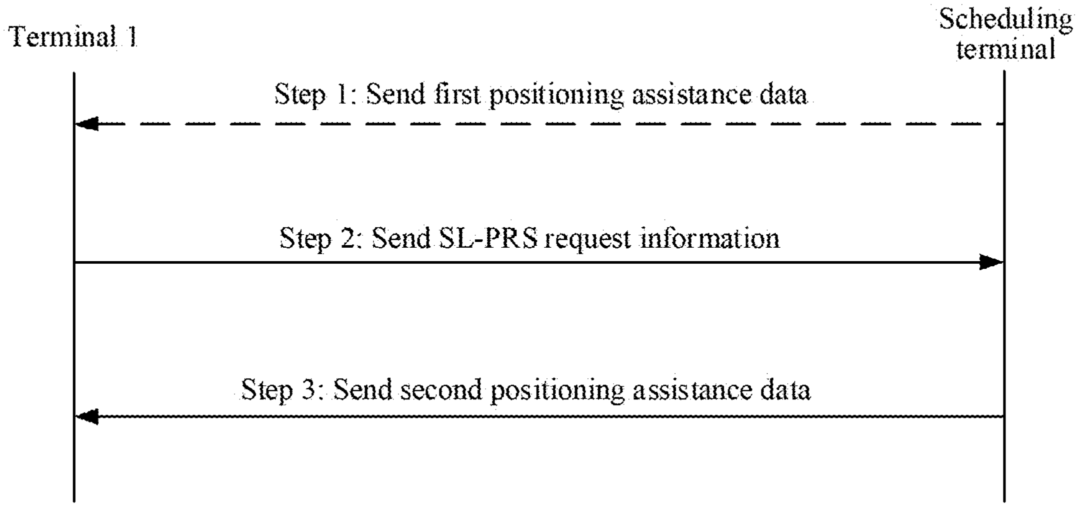
FIG. 11 is a schematic flowchart 10 of a positioning method according to an embodiment of this application.

Embodiment 7 (as shown in FIG. 11):

Step 1: A scheduling terminal sends first positioning assistance data to a terminal 1.

Step 2: The terminal 1 sends SL-PRS request information to the scheduling terminal.

Step 3: The scheduling terminal sends second positioning assistance data to the terminal 1.

Figure 12:
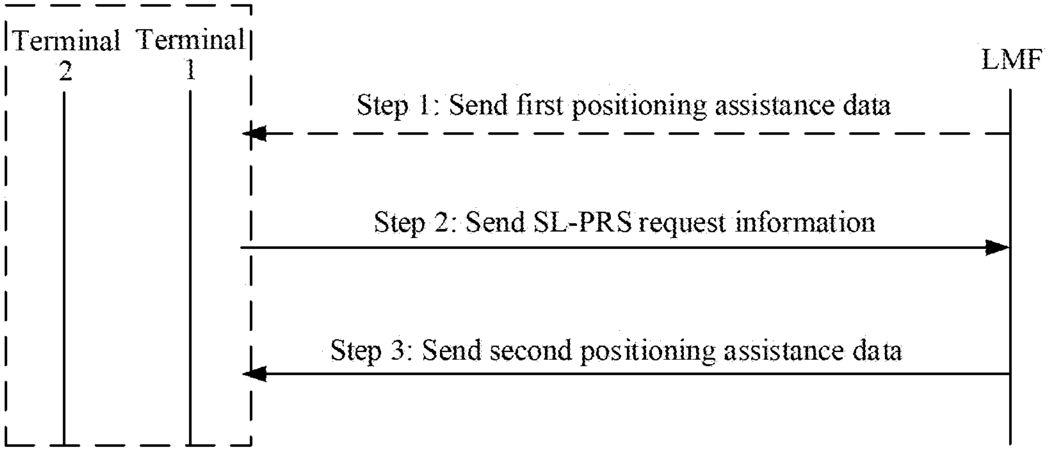
FIG. 12 is a schematic flowchart 11 of a positioning method according to an embodiment of this application.

Embodiment 8 (as shown in FIG. 12):

Step 1: An LMF (or a scheduling terminal) sends first positioning assistance data to a target terminal (for example, a terminal 1 and/or a terminal 2).

Step 2: The target terminal sends SL-PRS request information to the LMF (or the scheduling terminal).

Step 3: The LMF (or the scheduling terminal) sends second positioning assistance data to the target terminal.

Figure 13:
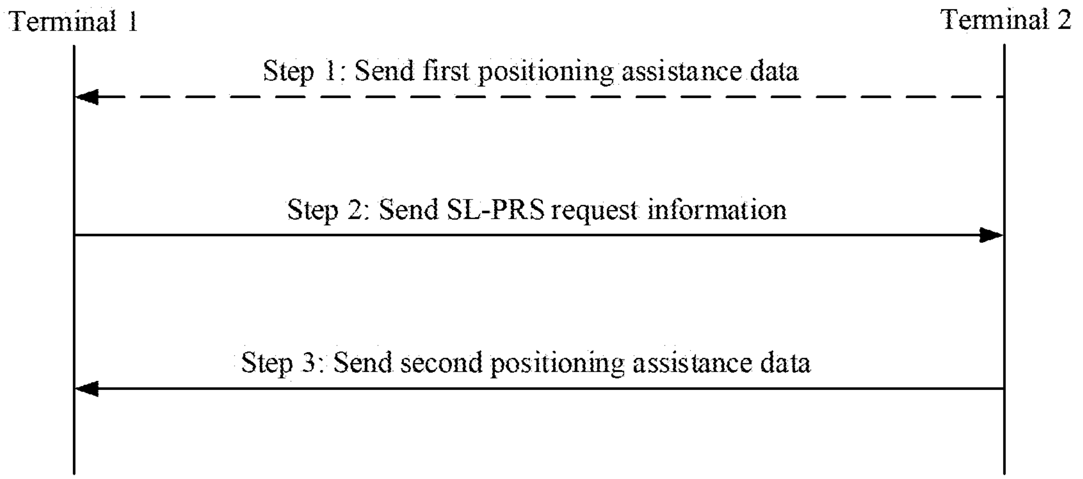
FIG. 13 is a schematic flowchart 12 of a positioning method according to an embodiment of this application.

Embodiment 9 (as shown in FIG. 13):

Step 1: A terminal 2 sends first positioning assistance data to a terminal 1.

Step 2: The terminal 1 sends SL-PRS request information to the terminal 2.

Step 3: The terminal 2 sends second positioning assistance data to the terminal 1.

Figure 14:
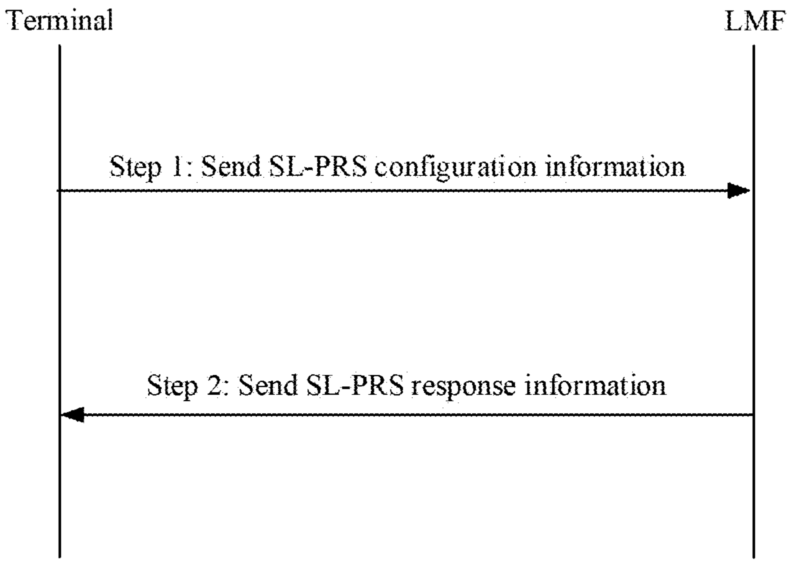
FIG. 14 is a schematic flowchart 13 of a positioning method according to an embodiment of this application.

Embodiment 10 (as shown in FIG. 14):

Step 1: A terminal sends SL-PRS configuration information to an LMF.

Step 2: The LMF sends SL-PRS response information to the terminal.

Figure 15:
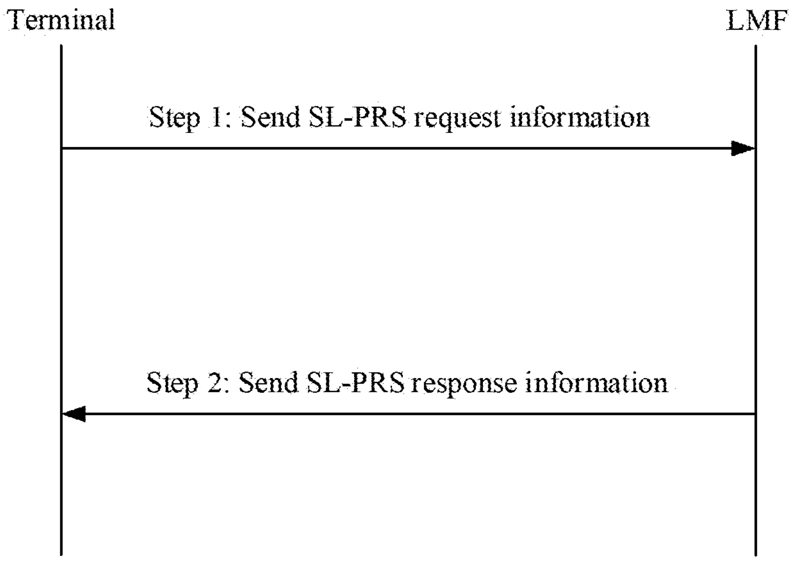
FIG. 15 is a schematic flowchart 14 of a positioning method according to an embodiment of this application.

Embodiment 11 (as shown in FIG. 15):

Step 1: A terminal sends SL-PRS request information to an LMF.

Step 2: The LMF sends SL-PRS response information to the terminal.

In the positioning method provided in this embodiment of this application, the first terminal performs transmission of a target message (including a positioning request and/or positioning assistance data) with the target device, to enable the first terminal to flexibly perform transmission of a first SL-PRS based on the request in the target message, and determine location information of the first terminal and/or the second terminal that performs SL communication or SL positioning with the first terminal, thereby implementing positioning between the terminals and resolving a problem that positioning can only be performed under sufficient network or GPS coverage, which improves communication energy efficiency of the system.

It should be noted that the positioning method provided in the embodiments of this application may be performed by a positioning apparatus, or a control module configured to perform the positioning method in the positioning apparatus. An example in which the positioning apparatus performs the positioning method is used in this embodiment of this application to describe the positioning apparatus provided in this embodiment of this application.

Figure 16:
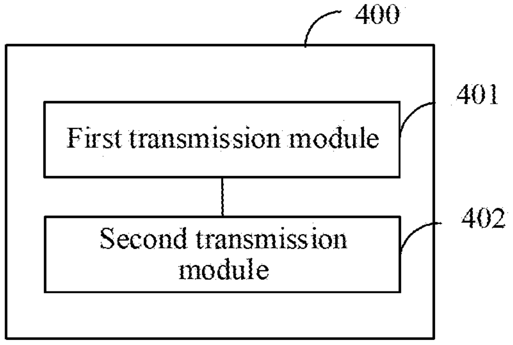
FIG. 16 is a schematic diagram of a structure of a positioning apparatus according to an embodiment of this application.

An embodiment of this application provides a positioning apparatus. As shown in FIG. 16, the positioning apparatus 400 includes a first transmission module 401 and a second transmission module 402.

The first transmission module 401 is configured to perform transmission of a target message with a target device. The second transmission module 402 is configured to perform transmission of a first sidelink positioning reference signal SL-PRS based on the target message. The target message includes at least one of the following: a positioning request or positioning assistance data. The first SL-PRS is used for determining: location information of the first terminal and/or a second terminal, and/or SL-PRS measurement information. The second terminal is a peer terminal that performs SL communication or SL positioning with the first terminal.

Optionally, the target device includes any one of the following: the second terminal, a network-side device, and a third terminal.

Optionally, the target message further includes at least one of the following: SL-PRS measurement reporting or feedback information, a positioning response, or capability information.

Optionally, the positioning request includes at least one of the following:

a positioning assistance data request,
a measurement request,
a location information reporting or feedback request,
an SL-PRS measurement reporting or feedback request,
a configuration request for at least one SL-PRS,
SL-PRS request indication information, or
feedback indication information for a measurement request.

The positioning assistance data request is used for requesting the positioning assistance data.

The measurement request is used for requesting a device to measure the first SL-PRS.

The location information reporting or feedback request is used for: requesting a device to report or feed back a resource of location information, or requesting a device to report or feed back the location information.

The SL-PRS measurement reporting or feedback request is used for: requesting a device to report or feed back a resource of SL-PRS measurement information, or requesting a device to report or feed back the SL-PRS measurement information;

The configuration request is used for requesting configuration or transmission of the at least one SL-PRS.

The SL-PRS request indication information is used to indicate whether to request for an SL-PRS.

The feedback indication information for a measurement request is used to indicate that the first SL-PRS is received, and/or indicate whether the device requested by the measurement request sends feedback information. The feedback information includes at least one of the following: the location information, SL-PRS measurement information, or HARQ information.

Optionally, the positioning assistance data request includes at least one of the following:

recognition information of a first target terminal,
recognition information of a second target terminal,
location information of the second target terminal,
a region identifier,
a communication range,
a positioning range,
quality of service QoS information related to positioning,
a resource request used for requesting transmission of a time-frequency resource of the first SL-PRS,
a configuration request for at least one SL-PRS,
the location information reporting or feedback request, or
the SL-PRS measurement reporting or feedback request.

The first target terminal is any one of the following: the first terminal, the second terminal, and a third terminal. The second target terminal is any one of the following: the first terminal, the second terminal, and the third terminal.

Optionally, the measurement request includes at least one of the following:

a positioning type request,
frequency band information,
a positioning method request,
a location information type,
a signal measurement request,
priority information of measurement of an SL-PRS,
priority information of transmission of the SL-PRS,
expected angle of departure AOD information, or
expected angle of arrival AOA information.

Optionally, the positioning request includes at least one of the following:

information about at least one SL-PRS configuration set,
first SL-PRS configuration information, or
second SL-PRS configuration information.

The second SL-PRS configuration information may be configuration information of an SL-PRS expected by the first terminal and/or the second terminal.

The information about at least one SL-PRS configuration set includes at least one of the following:

identification information of at least one SL-PRS configuration set, or
a configuration parameter of an SL-PRS in the at least one SL-PRS configuration set.

Optionally, the at least one SL-PRS configuration set includes: a target SL-PRS configuration set.

The target SL-PRS configuration set includes a configuration of at least one target SL-PRS.

The first SL-PRS is one or more SL-PRSs in the at least one target SL-PRS.

The target SL-PRS configuration set includes at least one of the following:

identification information of the target SL-PRS configuration set,
location information of a second target terminal,
priority information of measurement of a target SL-PRS,
priority information of transmission of the target SL-PRS,
expected angle of departure AOD information,
expected angle of arrival AOA information, or
a configuration parameter of the target SL-PRS in the target SL-PRS configuration set.

Optionally, in a case that an SL-PRS configuration received by the first terminal does not meet a positioning requirement of the first terminal and/or the second terminal, or the SL-PRS configuration received by the first terminal does not include a target SL-PRS, the positioning request includes: at least one SL-PRS configuration set used for selection on demand. The at least one SL-PRS configuration set includes a configuration of at least one SL-PRS. The first SL-PRS is one or more SL-PRSs in the at least one target SL-PRS.

Optionally, the second SL-PRS configuration information includes at least one of the following:

- bandwidth information of the SL-PRS;
- a sending start time of the SL-PRS;
- a sending end time of the SL-PRS;
- sending duration of the SL-PRS;
- measurement window information of the SL-PRS;
- configuration window information used for configuring the SL-PRS;
- a number of combs configured for the SL-PRS;
- a number of symbols of the SL-PRS;
- a target terminal set;
- a number of target terminals;
- identification information of a target terminal;
- a set of selected SL-PRSs;
- a resource of the selected SL-PRSs;
- identification information of the selected SL-PRSs;
- a resource set of the selected SL-PRSs; or
- a number of the selected SL-PRSs.

Optionally, the second SL-PRS configuration information includes at least one of the following:

- a configuration parameter of the SL-PRS;
- a maximum number of frequency layers of the SL-PRS;
- positioning frequency layer information of the SL-PRS;
- a subcarrier spacing of the SL-PRS;
- a resource bandwidth of the SL-PRS;
- a start point of a PRB of the SL-PRS;
- a frequency domain position start point of the SL-PRS;
- a comb size N of the SL-PRS;
- a cyclic prefix of the SL-PRS;
- an SL-PRS configuration of each frequency layer;
- identification information of the SL-PRS;
- PCI of the SL-PRS;
- an absolute radio frequency channel number ARFCN;
- a cell global identifier NCGI;
- a maximum number of resource sets of the SL-PRS;
- resource set information of the SL-PRS;
- a resource set identifier of the SL-PRS;
- a periodicity and resource set slot offset of the SL-PRS;
- a resource repetition factor of the SL-PRS;
- a resource time gap of the SL-PRS;
- a number of symbols of the SL-PRS;
- a first muting option of the SL-PRS;
- a second muting option of the SL-PRS;
- resource power information of the SL-PRS;
- a maximum number of SL-PRS resources included in each SL-PRS resource set in the at least one SL-PRS resource set;
- resource information of the SL-PRS,
- a resource identifier of the SL-PRS,
- a sequence identifier of the SL-PRS,
- an RE offset of the SL-PRS,
- a resource slot offset of the SL-PRS, or
- a resource symbol offset of the SL-PRS.

Optionally, the first SL-PRS configuration information includes a configuration parameter of a dedicated resource. Transmission of the first SL-PRS is performed based on the dedicated resource. The dedicated resource includes at least one of the following: a resource dedicated to scheduling of the SL-PRS or a resource dedicated to transmission of the SL-PRS.

Optionally, the configuration parameter of the dedicated resource includes at least one of the following:

- bandwidth information of the dedicated resource;
- a frequency domain position start point of the dedicated resource;
- information about a start RB of the dedicated resource;
- numerology information of the dedicated resource;
- a subcarrier spacing of the dedicated resource;
- a cyclic prefix CP of the dedicated resource;
- a start time of the dedicated resource;
- an end time of the dedicated resource;
- duration of the dedicated resource; or
- pool information of the dedicated resource.

Optionally, the first transmission module 401 is configured to: perform transmission of the first SL-PRS and a Uu interface positioning reference signal based on the target message.

Optionally, the positioning request includes at least one of the following:

- a positioning assistance data request and/or a Uu interface positioning assistance data request;
- a measurement request and/or a Uu interface signal measurement request;
- a location information reporting or feedback request, and/or a Uu interface location information reporting or feedback request;
- at least one SL-PRS configuration set, and/or at least one downlink sounding reference signal SRS configuration set, and/or at least one uplink SRS configuration set; or
- an SL-PRS measurement reporting or feedback request and/or a Uu interface measurement reporting or feedback request.

Optionally, the positioning assistance data includes at least one of the following:

- a time-frequency resource for sending an SL-PRS,
- a time-frequency resource for reporting or feeding back SL-PRS measurement,
- a time-frequency resource for reporting or feeding back location information,
- at least one SL-PRS configuration set,
- identification information of at least one SL-PRS configuration set,
- a configuration parameter of the SL-PRS in each SL-PRS configuration set,
- recognition information of a first target terminal,
- recognition information of a second target terminal,
- a region identifier,
- a communication range,
- a positioning range,
- quality of service QoS information related to positioning,
- priority information of measurement of a target SL-PRS, or
- priority information of transmission of the target SL-PRS.

The first target terminal is any one of the following: the first terminal, the second terminal, and a third terminal. The second target terminal is any one of the following: the first terminal, the second terminal, and the third terminal.

Optionally, the positioning assistance data includes positioning assistance data of at least one target terminal.

The positioning assistance data further includes at least one of the following:

- location information of the at least one target terminal,
- SL-PRS measurement information of the at least one target terminal, type information of the at least one target terminal, expected angle of departure AOD information corresponding to a target terminal, or expected angle of arrival AOA information corresponding to the target terminal.

the location information includes at least one of the following: absolute location information, relative location information, trajectory information, path information, speed information, or acceleration information. The SL-PRS measurement information includes at least one of the following: reference signal received power RSRP measurement information, reference signal time difference measurement information, receive-transmit time difference measurement information, arrival time measurement information, reference signal recognition information, reference signal received power information, angle measurement information, or transmission reception point identification information. The type information is used to indicate any one of the following: whether the target terminal supports the SL-PRS, or whether the target terminal supports an SL positioning method, or whether the target terminal is indicated as an RSU device, and whether the target terminal is a terminal of a type or a common terminal.

Optionally, the positioning assistance data of the at least one target terminal includes at least one of the following SL-PRS information corresponding to the target terminal:

the time-frequency resource for sending the SL-PRS, the time-frequency resource for reporting or feeding back the SL-PRS measurement, the time-frequency resource for reporting or feeding back the location information, the at least one SL-PRS configuration set, the identification information of the at least one SL-PRS configuration set, priority information of measurement and/or transmission of the SL-PRS, expected angle of departure AOD information of transmission or measurement of the SL-RPS, expected angle of arrival AOA information of transmission or measurement of the SL-RPS, or the configuration parameter of the SL-PRS in each SL-PRS configuration set.

Optionally, the SL-PRS measurement reporting or feedback information includes at least one of the following:

recognition information of a first target terminal, recognition information of a second target terminal, location information of the second target terminal, or SL-PRS measurement information.

The SL-PRS measurement information includes at least one of the following: reference signal received power RSRP measurement information, reference signal time difference measurement information, receive-transmit time difference measurement information, arrival time measurement information, reference signal recognition information, reference signal received power information, angle measurement information, or transmission reception point identification information.

The location information includes at least one of the following: absolute location information, relative location information, trajectory information, path information, speed information, or acceleration information.

The first target terminal is any one of the following: the first terminal, the second terminal, and a third terminal. The second target terminal is any one of the following: the first terminal, the second terminal, and the third terminal.

Optionally, the positioning response includes at least one of the following:

error indication information, error type information, no available resource information, error cause information, acknowledgment ACK information, negative acknowledgment NACK information, information of not supporting on-demand selection of a PRS, identification information of at least one SL-PRS configuration set, request success indication information or request failure indication information, configuration success indication information or configuration failure indication information, a configuration parameter of an SL-PRS in the at least one SL-PRS configuration set, recognition information of a first target terminal, recognition information of a second target terminal, a region identifier, a communication range, a positioning range, QoS information related to positioning, a time-frequency resource for sending the SL-PRS, or a time-frequency resource for reporting or feeding back SL-PRS measurement.

The first target terminal is any one of the following: the first terminal, the second terminal, and a third terminal. The second target terminal is any one of the following: the first terminal, the second terminal, and the third terminal.

Optionally, the capability information includes at least one of the following:

a capability of processing an SL-PRS; or a capability of an SL positioning method.

The capability of processing the SL-PRS includes at least one of the following: a capability of simultaneously processing the SL-PRS and a DL PRS, a capability of simultaneously processing the SL-PRS and a UL PRS, an SL-PRS buffer type, a frequency band supported by the SL-PRS, a number of frequency bands supported by the SL-PRS, a capability of supporting carrier aggregation, a maximum capability of processing the SL-PRS, duration of the SL-PRS, or a number of sent SL-PRSs. The capability of the SL positioning method includes at least one of the following: an SL-PRS measurement capability, a positioning mode, a multi-beam sending or measurement capability, quasi-co-location QCL, a capability of a path loss reference signal, a capability of supporting multi-path measurement or reporting, or a capability of supporting first-path measurement or reporting. The SL-PRS measurement capability includes at least one of the following: a maximum number of measured transmit terminals or a number of measured frequency layers.

Optionally, the target message includes any one of the following:

indication information indicating in-coverage; and indication information indicating out-of-coverage.

Optionally, in a case that the target device is the network-side device, transmission of the target message is performed through one or more of the following messages: dynamic grant information, configured grant information, an LPP message, an RRC message, and a MAC CE message.

Optionally, in a case that the target device is the second terminal or the third terminal, transmission of the target message is performed through one or more of the following messages: sidelink control information SCI; a physical sidelink shared channel PSSCH; a PC5-LPP message; and a PC5-RRC message.

Optionally, the target message includes time domain offset information.

The time domain offset information includes at least one of the following:

offset information between SL-PRS measurement reporting or feedback and an SL-PRS;

offset information between location information reporting or feedback and the SL-PRS;

offset information between the positioning request and the SL-PRS;

offset information between the positioning request and the SL-PRS measurement reporting or feedback;

offset information between the SCI and the SL-PRS;

offset information between the SCI and the SL-PRS measurement reporting or feedback;

offset information between the SCI and the location information reporting or feedback; or offset information between the SCI and the positioning request.

Optionally, the SCI includes at least one of the following: first stage SCI, second stage SCI, or third SCI. The third SCI is dedicated to scheduling of an SL-PRS.

Optionally, the first transmission module 401 is configured to send the target message to the target device.

The first transmission module 401 is further configured to receive a first message before sending the target message; and/or receive a second message after sending the target message.

Optionally, the target message includes the positioning request. The first message includes the positioning assistance data or the positioning response. The second message includes configuration information of a target SL-PRS or activation information of the target SL-PRS.

Optionally, the first transmission module 401 is configured to receive the target message from the target device.

The first transmission module 401 is further configured to receive a third message before receiving the target message; and/or receives a fourth message after the first terminal receives the target message.

Optionally, the target message includes the positioning request. The third message includes the positioning assistance data. The fourth message includes a positioning response. In a case that the positioning request includes an SL-PRS measurement or reporting request, the positioning response includes a time-frequency resource for reporting or feeding back SL-PRS measurement of the SL-PRS. In a case that the positioning request includes a location information reporting or feedback request, the positioning response includes location information of a target terminal. In a case that the positioning request includes an SL-PRS measurement reporting or feedback request, the positioning response includes measurement information of the target terminal. The target terminal is any one of the following: the first terminal, the second terminal, and the third terminal.

In the positioning apparatus provided in this embodiment of this application, the apparatus performs transmission of a target message (including a positioning request and/or positioning assistance data) with the target device, to enable the first terminal to flexibly perform transmission of a first SL-PRS based on the request in the target message, and determine location information of the first terminal and/or the second terminal that performs SL communication or SL positioning with the first terminal, thereby implementing positioning between the terminals and resolving a problem that positioning can only be performed under sufficient network or GPS coverage, which improves communication energy efficiency of the system.

The positioning apparatus in the embodiments of this application may be an apparatus, an apparatus or an electronic device with an operating system, or may be a component, an integrated circuit, or a chip in a terminal. The apparatus or the electronic device may be a mobile terminal, or may be a non-mobile terminal. For example, the mobile terminal may include, but is not limited to, the types of terminal 11 listed above, and the non-mobile terminal may be a server, a network attached storage (NAS), a personal computer (PC), a television (TV), a teller machine, a self-service machine, or the like, which is not limited in the embodiments of this application.

The positioning apparatus provided in this embodiment of this application can implement the processes implemented in method embodiments of FIG. 2 to FIG. 15, and the same technical effects can be achieved. To avoid repetition, details are not described herein again.

Figure 17:
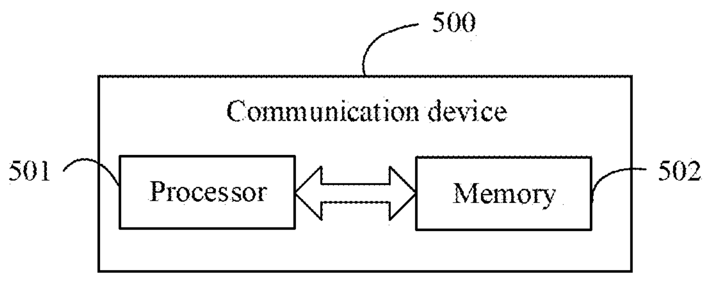
FIG. 17 is a schematic diagram of a hardware structure of a communication device according to an embodiment of this application.

Optionally, as shown in FIG. 17, an embodiment of this application further provides a communication device 500, including a processor 501, a memory 502, a program or instructions stored in the memory 502 and executable on the processor 501. For example, when the communication device 500 is a terminal, when the program or the instructions are executed by the processor 501, processes in the embodiments of the positioning method are implemented, and the same technical effects can be achieved.

An embodiment of this application further provides a terminal, including a processor and a communication interface. The communication interface is configured to perform transmission of a target message with a target device, and is further configured to perform transmission of a first sidelink positioning reference signal SL-PRS based on the target message. The target message includes at least one of the following: a positioning request or positioning assistance data. The first SL-PRS is used for determining: location information of the first terminal and/or a second terminal, and/or SL-PRS measurement information. The second terminal is a peer terminal that performs SL communication or SL positioning with the first terminal. The terminal embodiment corresponds to the method embodiment of the terminal side. Implementation processes and implementations in the foregoing method embodiment all are applicable to the terminal embodiment, and the same technical effects can be achieved.

Figure 18:
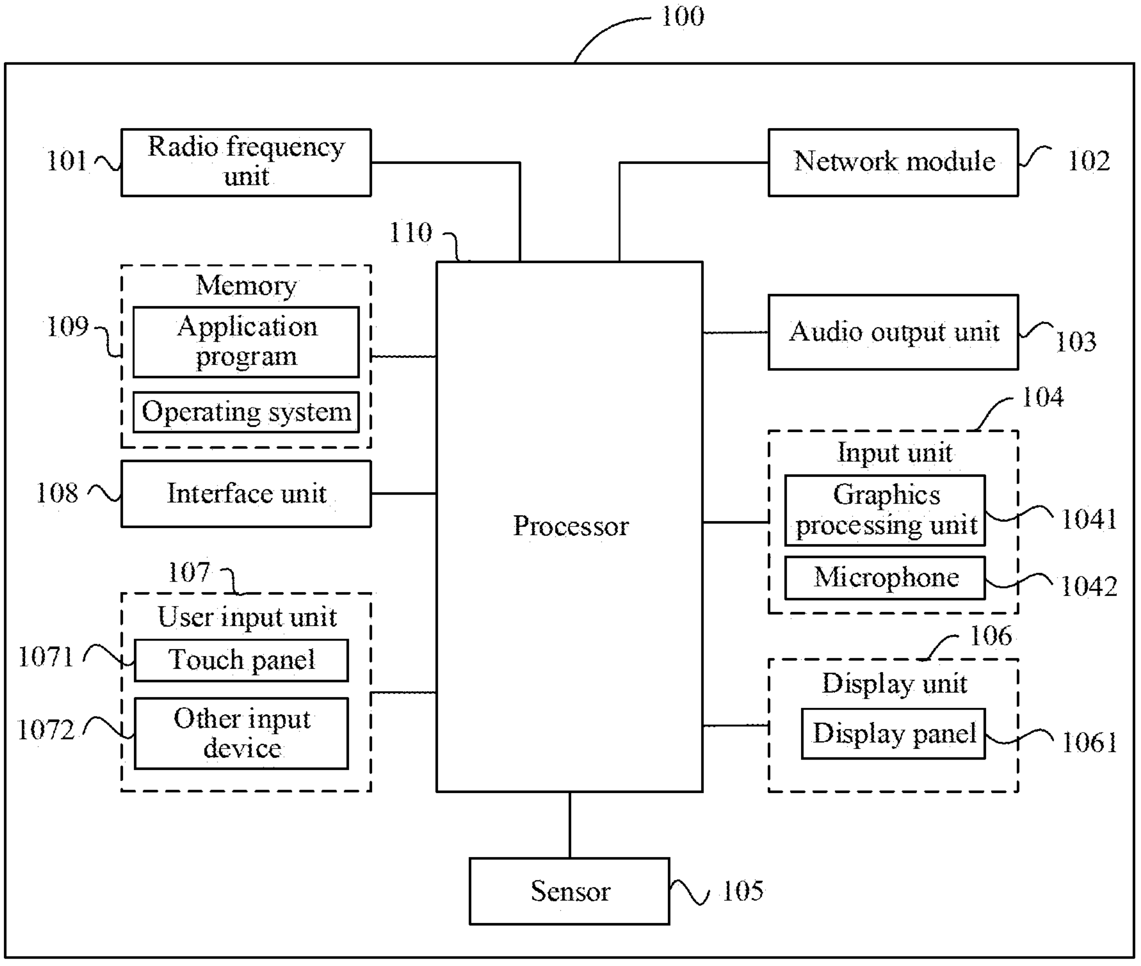
FIG. 18 is a schematic diagram of a hardware structure of a terminal according to an embodiment of this application.

FIG. 18 is a schematic diagram of a hardware structure of a terminal implementing an embodiment of this application.

The terminal 100 includes, but is not limited to: at least some components of a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the terminal 100 may further include a power supply (such as a battery) for supplying power to the components. The power supply may be logically connected to the processor 110 by a power management system, thereby implementing functions such as charging, discharging, and power consumption management by using the power management system. A terminal structure shown in FIG. 18 does not constitute a limitation on the terminal, and the terminal may include more or fewer components than those shown in the figure, or some components may be combined, or a different component deployment may be used. Details are not described herein again.

It should be understood that in the embodiments of this application the input unit 104 may include a graphics processing unit (GPU) 1041 and a microphone 1042, and the graphics processing unit 1041 processes image data of static pictures or videos obtained by an image capturing device (such as a camera) in a video capturing mode or an image capturing mode. The display unit 106 may include a display panel 1061, and the display panel 1061 may be configured by using a liquid crystal display, an organic light-emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include, but is not limited to, a physical keyboard, a function key (such as a volume control key or a switch key), a track ball, a mouse, and a joystick, which is not described herein again.

In this embodiment of this application, after receiving downlink data from a network-side device, the radio frequency unit 101 hands over the downlink data to the processor 110 for processing; and sends uplink data to the network-side device. Generally, the radio frequency unit 101 includes, but is not limited to, an antenna, at least one amplifier, a transceiver, a coupler, a low noise amplifier, a duplexer, and the like.

The memory 109 is configured to store a software program or instructions and various data. The memory 109 may mainly include a program or an instruction storage area and a data storage area. The program storage or instruction storage area may store an operating system, an application program or instructions required by at least one function (for example, a sound playback function and an image display function), and the like. In addition, the memory 109 may include a high-speed random access memory, and may include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash memory, or another volatile solid-state storage device.

The processor 110 may include one or more processing units. Optionally, the processor 110 may integrate an application processor and a modem. The application processor mainly processes the operating system, a user interface, an application program or instructions, and the like, and the modem mainly processes wireless communication, for example, a baseband processor. It may be understood that the foregoing modem may alternatively not be integrated into the processor 110.

The radio frequency unit 101 is configured to perform transmission of a target message with a target device. The radio frequency unit 101 is further configured to perform transmission of a first sidelink positioning reference signal SL-PRS based on the target message. The target message includes at least one of the following: a positioning request or positioning assistance data. The first SL-PRS is used for determining: location information of the first terminal and/or a second terminal, and/or SL-PRS measurement information. The second terminal is a peer terminal that performs SL communication or SL positioning with the first terminal.

Optionally, the target device includes any one of the following: the second terminal, a network-side device, and a third terminal.

Optionally, the target message further includes at least one of the following: SL-PRS measurement reporting or feedback information, a positioning response, or capability information.

Optionally, the positioning request includes at least one of the following: a positioning assistance data request, a measurement request, a location information reporting or feedback request, an SL-PRS measurement reporting or feedback request, a configuration request for at least one SL-PRS, SL-PRS request indication information, or feedback indication information for a measurement request. The positioning assistance data request is used for requesting the positioning assistance data. The measurement request is used for requesting a device to measure the first SL-PRS. The location information reporting or feedback request is used for: requesting a device to report or feed back a resource of location information, or requesting a device to report or feed back the location information. The SL-PRS measurement reporting or feedback request is used for: requesting a device to report or feed back a resource of SL-PRS measurement information, or requesting a device to report or feed back the SL-PRS measurement information. The configuration request is used for requesting configuration or transmission of the at least one SL-PRS. The SL-PRS request indication information is used to indicate whether to request for an SL-PRS. The feedback indication information for a measurement request is used to indicate that the first SL-PRS is received, and/or indicate whether the device requested by the measurement request sends feedback information. The feedback information includes at least one of the following: the location information, SL-PRS measurement information, or HARQ information.

Optionally, the positioning assistance data request includes at least one of the following: recognition information of a first target terminal, recognition information of a second target terminal, location information of the second target terminal, a region identifier, a communication range, a positioning range, QoS information related to positioning, a resource request used for requesting transmission of a time-frequency resource of the first SL-PRS, a configuration request for at least one SL-PRS, a location information reporting or feedback request, or an SL-PRS measurement reporting or feedback request. The first target terminal is any one of the following: the first terminal, the second terminal, and a third terminal. The second target terminal is any one of the following: the first terminal, the second terminal, and the third terminal.

Optionally, the measurement request includes at least one of the following: a positioning type request, frequency band information, a positioning method request, a location information type, a signal measurement request, priority information of measurement of an SL-PRS, priority information of transmission of the SL-PRS, expected angle of departure AOD information, or expected angle of arrival AOA information.

Optionally, the positioning request includes at least one of the following: information about at least one SL-PRS configuration set, first SL-PRS configuration information, or second SL-PRS configuration information. The second SL-PRS configuration information is configuration information of the SL-PRS expected by the first terminal and/or the second terminal. The information about at least one SL-PRS configuration set includes at least one of the following: identification information of the at least one SL-PRS configuration set or a configuration parameter of the SL-PRS the at least one SL-PRS configuration set.

Optionally, the at least one SL-PRS configuration set includes: a target SL-PRS configuration set. The target SL-PRS configuration set includes a configuration of at least one target SL-PRS. The first SL-PRS is one or more SL-PRSs in the at least one target SL-PRS.

The target SL-PRS configuration set includes at least one of the following: identification information of the target SL-PRS configuration set, location information of the second target terminal, priority information of measurement of a target SL-PRS, priority information of transmission of the target SL-PRS, expected angle of departure AOD information, expected angle of arrival AOA information, or the configuration parameter of the target SL-PRS in the target SL-PRS configuration set.

Optionally, in a case that an SL-PRS configuration received by the first terminal does not meet a positioning requirement of the first terminal and/or the second terminal, or the SL-PRS configuration received by the first terminal does not include a target SL-PRS, the positioning request includes: at least one SL-PRS configuration set used for selection on demand. The at least one SL-PRS configuration set includes a configuration of at least one SL-PRS. The first SL-PRS is one or more SL-PRSs in the at least one target SL-PRS.

Optionally, the second SL-PRS configuration information includes at least one of the following: bandwidth information of the SL-PRS; a sending start time of the SL-PRS; a sending end time of the SL-PRS; sending duration of the SL-PRS; measurement window information of the SL-PRS; configuration window information used for configuring the SL-PRS; a number of combs configured for the SL-PRS; a number of symbols of the SL-PRS; a target terminal set; a number of target terminals; identification information of a target terminal; a set of selected SL-PRSs; a resource of the selected SL-PRSs; identification information of the selected SL-PRSs; a resource set of the selected SL-PRSs; or a number of the selected SL-PRSs.

Optionally, the second SL-PRS configuration information includes at least one of the following: a configuration parameter of the SL-PRS; a maximum number of frequency layers of the SL-PRS; positioning frequency layer information of the SL-PRS; a subcarrier spacing of the SL-PRS; a resource bandwidth of the SL-PRS; a start point of a PRB of the SL-PRS; a frequency domain position start point of the SL-PRS; a comb size N of the SL-PRS; a cyclic prefix of the SL-PRS; an SL-PRS configuration of each frequency layer; identification information of the SL-PRS; PCI of the SL-PRS; an absolute radio frequency channel number ARFCN; a cell global identifier NCGI; a maximum number of resource sets of the SL-PRS; resource set information of the SL-PRS; a resource set identifier of the SL-PRS; a periodicity and resource set slot offset of the SL-PRS; a resource repetition factor of the SL-PRS; a resource time gap of the SL-PRS; a number of symbols of the SL-PRS; a first muting option of the SL-PRS; a second muting option of the SL-PRS; resource power information of the SL-PRS; a maximum number of SL-PRS resources included in each SL-PRS resource set in the at least one SL-PRS resource set; resource information of the SL-PRS, a resource identifier of the SL-PRS, a sequence identifier of the SL-PRS, an RE offset of the SL-PRS, a resource slot offset of the SL-PRS, or a resource symbol offset of the SL-PRS.

Optionally, the first SL-PRS configuration information includes a configuration parameter of a dedicated resource. Transmission of the first SL-PRS is performed based on the dedicated resource. The dedicated resource includes at least one of the following: a resource dedicated to scheduling of the SL-PRS or a resource dedicated to transmission of the SL-PRS.

Optionally, the configuration parameter of the dedicated resource includes at least one of the following:

- bandwidth information of the dedicated resource;
- a frequency domain position start point of the dedicated resource;
- information about a start RB of the dedicated resource;
- numerology information of the dedicated resource;
- a subcarrier spacing of the dedicated resource;
- a cyclic prefix CP of the dedicated resource;
- a start time of the dedicated resource;
- an end time of the dedicated resource;
- duration of the dedicated resource; or
- pool information of the dedicated resource.

Optionally, the radio frequency unit 101 is configured to: perform transmission of the first SL-PRS and a Uu interface positioning reference signal based on the target message.

Optionally, the positioning request includes at least one of the following:

- a positioning assistance data request and/or a Uu interface positioning assistance data request;
- a measurement request and/or a Uu interface signal measurement request;
- a location information reporting or feedback request, and/or a Uu interface location information reporting or feedback request;
- at least one SL-PRS configuration set, and/or at least one downlink sounding reference signal SRS configuration set, and/or at least one uplink SRS configuration set; or
- an SL-PRS measurement reporting or feedback request and/or a Uu interface measurement reporting or feedback request.

Optionally, the positioning assistance data includes at least one of the following:

- a time-frequency resource for sending an SL-PRS,
- a time-frequency resource for reporting or feeding back SL-PRS measurement,
- a time-frequency resource for reporting or feeding back location information,
- at least one SL-PRS configuration set,
- identification information of at least one SL-PRS configuration set,
- a configuration parameter of the SL-PRS in each SL-PRS configuration set,
- recognition information of a first target terminal,
- recognition information of a second target terminal,
- a region identifier,
- a communication range,
- a positioning range,
- quality of service QoS information related to positioning,
- priority information of measurement of a target SL-PRS, or
- priority information of transmission of the target SL-PRS.

The first target terminal is any one of the following: the first terminal, the second terminal, and a third terminal. The second target terminal is any one of the following: the first terminal, the second terminal, and the third terminal.

Optionally, the positioning assistance data includes positioning assistance data of at least one target terminal.

The positioning assistance data further includes at least one of the following:

- location information of the at least one target terminal,
- SL-PRS measurement information of the at least one target terminal,
- type information of the at least one target terminal, expected angle of departure AOD information corresponding to a target terminal, or expected angle of arrival AOA information corresponding to the target terminal.

The location information includes at least one of the following: absolute location information, relative location information, trajectory information, path information, speed information, or acceleration information. The SL-PRS measurement information includes at least one of the following: reference signal received power RSRP measurement information, reference signal time difference measurement information, receive-transmit time difference measurement information, arrival time measurement information, reference signal recognition information, reference signal received power information, angle measurement information, or transmission reception point identification information. The type information is used to indicate any one of the following: whether the target terminal supports the SL-PRS, or whether the target terminal supports an SL positioning method, or whether the target terminal is indicated as an RSU device, and whether the target terminal is a terminal of a type or a common terminal.

Optionally, the positioning assistance data of the at least one target terminal includes at least one of the following SL-PRS information corresponding to the target terminal:

the time-frequency resource for sending the SL-PRS, the time-frequency resource for reporting or feeding back the SL-PRS measurement, the time-frequency resource for reporting or feeding back the location information, the at least one SL-PRS configuration set, the identification information of the at least one SL-PRS configuration set, priority information of measurement and/or transmission of the SL-PRS, expected angle of departure AOD information of transmission or measurement of the SL-RPS, expected angle of arrival AOA information of transmission or measurement of the SL-RPS, or the configuration parameter of the SL-PRS in each SL-PRS configuration set.

Optionally, the SL-PRS measurement reporting or feedback information includes at least one of the following:

recognition information of a first target terminal, recognition information of a second target terminal, location information of the second target terminal, or SL-PRS measurement information.

The SL-PRS measurement information includes at least one of the following: reference signal received power RSRP measurement information, reference signal time difference measurement information, receive-transmit time difference measurement information, arrival time measurement information, reference signal recognition information, reference signal received power information, angle measurement information, or transmission reception point identification information.

The location information includes at least one of the following: absolute location information, relative location information, trajectory information, path information, speed information, or acceleration information;

The first target terminal is any one of the following: the first terminal, the second terminal, and a third terminal. The second target terminal is any one of the following: the first terminal, the second terminal, and the third terminal.

Optionally, the positioning response includes at least one of the following: error indication information, error type information, no available resource information, error cause information, acknowledgment ACK information, negative acknowledgment NACK information, information of not supporting on-demand selection of a PRS, identification information of at least one SL-PRS configuration set, request success indication information or request failure indication information, configuration success indication information or configuration failure indication information, a configuration parameter of an SL-PRS in the at least one SL-PRS configuration set, recognition information of a first target terminal, recognition information of a second target terminal, a region identifier, a communication range, a positioning range, QoS information related to positioning, a time-frequency resource for sending the SL-PRS, or a time-frequency resource for reporting or feeding back SL-PRS measurement. The first target terminal is any one of the following: the first terminal, the second terminal, and a third terminal. The second target terminal is any one of the following: the first terminal, the second terminal, and the third terminal.

Optionally, the capability information includes at least one of the following:

a capability of processing an SL-PRS; or a capability of an SL positioning method.

The capability of processing the SL-PRS includes at least one of the following: a capability of simultaneously processing the SL-PRS and a DL PRS, a capability of simultaneously processing the SL-PRS and a UL PRS, an SL-PRS buffer type, a frequency band supported by the SL-PRS, a number of frequency bands supported by the SL-PRS, a capability of supporting carrier aggregation, a maximum capability of processing the SL-PRS, duration of the SL-PRS, or a number of sent SL-PRSs. The capability of the SL positioning method includes at least one of the following: an SL-PRS measurement capability, a positioning mode, a multi-beam sending or measurement capability, quasi-co-location QCL, a capability of a path loss reference signal, a capability of supporting multi-path measurement or reporting, or a capability of supporting first-path measurement or reporting. The SL-PRS measurement capability includes at least one of the following: a maximum number of measured transmit terminals or a number of measured frequency layers.

Optionally, the target message includes any one of the following:

indication information indicating in-coverage; and indication information indicating out-of-coverage.

Optionally, in a case that the target device is the network-side device, transmission of the target message is performed through one or more of the following messages: dynamic grant information, configured grant information, an LPP message, an RRC message, and a MAC CE message.

Optionally, in a case that the target device is the second terminal or the third terminal, transmission of the target message is performed through one or more of the following messages: sidelink control information SCI; a physical sidelink shared channel PSSCH; a PC5-LPP message; and a PC5-RRC message.

Optionally, the target message includes time domain offset information.

The time domain offset information includes at least one of the following:

offset information between SL-PRS measurement reporting or feedback and an SL-PRS;

offset information between the positioning request and the SL-PRS;

offset information between the positioning request and the SL-PRS measurement reporting or feedback;

offset information between location information reporting or feedback and the SL-PRS;

offset information between the SCI and the SL-PRS;

offset information between the SCI and the SL-PRS measurement reporting or feedback;

offset information between the SCI and the location information reporting or feedback; or offset information between the SCI and the positioning request.

Optionally, the SCI includes at least one of the following: first stage SCI, second stage SCI, or third SCI. The third SCI is dedicated to scheduling of an SL-PRS.

Optionally, the radio frequency unit 101 is configured to send the target message to the target device.

The radio frequency unit 101 is further configured to receive a first message before sending the target message; and/or receive a second message after sending the target message.

Optionally, the target message includes the positioning request. The first message includes the positioning assistance data or the positioning response. The second message includes configuration information of a target SL-PRS or activation information of the target SL-PRS.

Optionally, the radio frequency unit 101 is configured to receive the target message from the target device.

The radio frequency unit 101 is further configured to receive a third message before receiving the target message; and/or receives a fourth message after the first terminal receives the target message.

Optionally, the target message includes the positioning request. The third message includes the positioning assistance data. The fourth message includes a positioning response. In a case that the positioning request includes an SL-PRS measurement or reporting request, the positioning response includes a time-frequency resource for reporting or feeding back SL-PRS measurement of the SL-PRS. In a case that the positioning request includes a location information reporting or feedback request, the positioning response includes location information of a target terminal. In a case that the positioning request includes an SL-PRS measurement reporting or feedback request, the positioning response includes measurement information of the target terminal. The target terminal is any one of the following: the first terminal, the second terminal, and the third terminal.

In the positioning apparatus provided in this embodiment of this application, the apparatus performs transmission of a target message (including a positioning request and/or positioning assistance data) with the target device, to enable the first terminal to flexibly perform transmission of a first SL-PRS based on the request in the target message, and determine location information of the first terminal and/or the second terminal that performs SL communication or SL positioning with the first terminal, thereby implementing positioning between the terminals and resolving a problem that positioning can only be performed under sufficient network or GPS coverage, which improves communication energy efficiency of the system.

An embodiment of this application further provides a non-transitory readable storage medium. The non-transitory readable storage medium stores a program or instructions. When the program or the instructions are executed by a processor, processes in the embodiments of the positioning method are implemented, and the same technical effects can be achieved. To avoid repetition, details are not described herein again.

The processor is a processor in the terminal described in the foregoing embodiments. The non-transitory readable storage medium includes a non-transitory computer-readable storage medium such as a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions, to implement the processes in the embodiments of the positioning method, and the same technical effects can be achieved. To avoid repetition, details are not described herein again.

It should be noted that, the chip mentioned in the embodiments of this application may also be referred to as a system-level chip, a system chip, a chip system, a system on chip, or the like.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the method and apparatus in the implementations of this application is not limited to performing the functions in the order shown or discussed, but may also include performing the functions in a substantially simultaneous manner or in reverse order according to the functions involved. For example, the described methods may be performed in a different order than described, and various steps may be added, omitted, or combined. In addition, features described with reference to some examples may be combined in other examples.

Through the descriptions of the foregoing implementations, a person skilled in the art may clearly understand that the method according to the foregoing embodiments may be implemented by software and a necessary general hardware platform, and certainly, may alternatively be implemented by hardware. Based on such an understanding, the technical solutions of this application essentially or the part contributing to the related art may be implemented in a form of a computer software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the embodiments described above, and the embodiments described above are merely illustrative and not limitative. Enlightened by this application, a person of ordinary skill in the art may make various variation without departing from the idea of this application and the protection scope of the claims, and such variations shall all fall within the protection scope of this application.

What is claimed is:

1. A positioning method, comprising:

performing, by a first terminal, transmission of a target message with a target device; and performing, by the first terminal, transmission of a first sidelink positioning reference signal (SL-PRS) based on the target message, wherein the target message comprises at least one of: a positioning request or positioning assistance data;

the first SL-PRS is used for determining: location information of the first terminal and/or a second terminal, and/or SL-PRS measurement information;

the second terminal is a peer terminal that performs sidelink (SL) communication or SL positioning with the first terminal, and the target device is the second terminal;

the target message comprises time domain offset information which is offset information between sidelink control information (SCI) and an SL-PRS; and the transmission of the target message is performed through the SCI, wherein the SCI is dedicated to scheduling of the SL-PRS.

2. The method according to claim 1, wherein the target message further comprises at least one of: location reporting or feedback information, SL-PRS measurement reporting or feedback information, a positioning response, or capability information.

3. The method according to claim 1, wherein the positioning request comprises at least one of:

a positioning assistance data request, a measurement request, a location information reporting or feedback request, an SL-PRS measurement reporting or feedback request, a configuration request for at least one SL-PRS, SL-PRS request indication information, or feedback indication information for a measurement request, wherein the positioning assistance data request is used for requesting the positioning assistance data;

the measurement request is used for requesting a device to measure the first SL-PRS;

the location information reporting or feedback request is used for: requesting a device to report or feed back a resource of location information, or requesting a device to report or feed back the location information;

the SL-PRS measurement reporting or feedback request is used for: requesting a device to report or feed back a resource of SL-PRS measurement information, or requesting a device to report or feed back the SL-PRS measurement information;

the configuration request is used for requesting configuration or transmission of the at least one SL-PRS;

the SL-PRS request indication information is used to indicate whether to request for the SL-PRS; and the feedback indication information for a measurement request is used to indicate that the first SL-PRS is received, and/or indicate whether the device requested by the measurement request sends feedback information, wherein the feedback information comprises at least one of: the location information, the SL-PRS measurement information, or hybrid automatic repeat request (HARQ) information.

4. The method according to claim 3, wherein the positioning assistance data request comprises at least one of:

recognition information of a first target terminal, recognition information of a second target terminal, location information of the second target terminal, a region identifier, a communication range, a positioning range, quality of service (QoS) information related to positioning, a resource request used for requesting transmission of a time-frequency resource of the first SL-PRS, a configuration request for at least one SL-PRS, the location information reporting or feedback request, or the SL-PRS measurement reporting or feedback request; wherein the first target terminal is any one of following: the first terminal, the second terminal, and a third terminal, and the second target terminal is any one of following: the first terminal, the second terminal, and the third terminal;

or, the measurement request comprises at least one of:

a positioning type request, frequency band information, a positioning method request, a location information type, a signal measurement request, priority information of measurement of a SL-PRS, priority information of transmission of the SL-PRS, expected angle of departure (AOD) information, or expected angle of arrival (AOA) information.

5. The method according to claim 1, wherein the positioning request comprises at least one of:

information about at least one SL-PRS configuration set, first SL-PRS configuration information, or second SL-PRS configuration information, wherein the second SL-PRS configuration information is configuration information of an SL-PRS expected by the first terminal and/or the second terminal; and the information about at least one SL-PRS configuration set comprises at least one of:

identification information of the at least one SL-PRS configuration set, or a configuration parameter of an SL-PRS in the at least one SL-PRS configuration set.

6. The method according to claim 5, wherein the at least one SL-PRS configuration set comprises: a target SL-PRS configuration set;

the target SL-PRS configuration set comprises a configuration of at least one target SL-PRS;

the first SL-PRS is one or more SL-PRSs in the at least one target SL-PRS; and the target SL-PRS configuration set comprises at least one of:

identification information of the target SL-PRS configuration set, location information of a second target terminal, priority information of measurement of a target SL-PRS, priority information of transmission of the target SL-PRS, expected angle of departure (AOD) information, expected angle of arrival (AOA) information, or a configuration parameter of the target SL-PRS in the target SL-PRS configuration set.

7. The method according to claim 5, wherein the second SL-PRS configuration information comprises at least one of:

bandwidth information of the SL-PRS;

a sending start time of the SL-PRS;

a sending end time of the SL-PRS;

sending duration of the SL-PRS;

measurement window information of the SL-PRS;

configuration window information used for configuring the SL-PRS;

a number of combs configured for the SL-PRS;

a number of symbols of the SL-PRS;

a target terminal set;

a number of target terminals;

identification information of a target terminal;

a set of selected SL-PRSs;

a resource of the selected SL-PRSs;

identification information of the selected SL-PRSs;

a resource set of the selected SL-PRSs; or a number of the selected SL-PRSs;

or, the first SL-RPS configuration information comprises at least one of:

a configuration parameter of the SL-PRS;

a maximum number of frequency layers of the SL-PRS;

positioning frequency layer information of the SL-PRS;

a subcarrier spacing of the SL-PRS;

a resource bandwidth of the SL-PRS;

a start point of a physical resource block (PRB) of the SL-PRS;

a frequency domain position start point of the SL-PRS;

a comb size N of the SL-PRS;

a cyclic prefix of the SL-PRS;

an SL-PRS configuration of each frequency layer;

identification information of the SL-PRS;

physical cell identifier (PCI) of the SL-PRS;

an absolute radio frequency channel number (ARFCN);

a cell global identifier;

a maximum number of resource sets of the SL-PRS;

resource set information of the SL-PRS;

a resource set identifier of the SL-PRS;

a periodicity and resource set slot offset of the SL-PRS;

a resource repetition factor of the SL-PRS;

a resource time gap of the SL-PRS;

a number of symbols of the SL-PRS;

a first muting option of the SL-PRS;

a second muting option of the SL-PRS;

resource power information of the SL-PRS;

a maximum number of SL-PRS resources comprised in each SL-PRS resource set in the at least one SL-PRS resource set;

resource information of the SL-PRS, a resource identifier of the SL-PRS, a sequence identifier of the SL-PRS, an resource element (RE) offset of the SL-PRS, a resource slot offset of the SL-PRS, or a resource symbol offset of the SL-PRS.

8. The method according to claim 5, wherein the first SL-PRS configuration information comprises a configuration parameter of a dedicated resource; and the transmission of the first SL-PRS is performed based on the dedicated resource, wherein the dedicated resource comprises at least one of: a resource dedicated to scheduling of the SL-PRS or a resource dedicated to transmission of the SL-PRS;

wherein the configuration parameter of the dedicated resource comprises at least one of:

bandwidth information of the dedicated resource;

a frequency domain position start point of the dedicated resource;

information about a start resource block (RB) of the dedicated resource;

numerology information of the dedicated resource;

a subcarrier spacing of the dedicated resource;

a cyclic prefix (CP) of the dedicated resource;

a start time of the dedicated resource;

an end time of the dedicated resource;

duration of the dedicated resource; or pool information of the dedicated resource.

9. The method according to claim 1, wherein the positioning assistance data comprises at least one of:

a time-frequency resource for sending a SL-PRS, a time-frequency resource for reporting or feeding back location information, a time-frequency resource for reporting or feeding back SL-PRS measurement, at least one SL-PRS configuration set, identification information of the at least one SL-PRS configuration set, a configuration parameter of the SL-PRS in each SL-PRS configuration set, recognition information of a first target terminal, recognition information of a second target terminal, a region identifier, a communication range, a positioning range, quality of service (QoS) information related to positioning, priority information of measurement of a target SL-PRS, or priority information of transmission of the target SL-PRS; wherein the first target terminal is any one of following: the first terminal, the second terminal, and a third terminal, and the second target terminal is any one of following: the first terminal, the second terminal, and the third terminal.

10. The method according to claim 9, wherein the positioning assistance data comprises positioning assistance data of at least one target terminal, and the positioning assistance data further comprises at least one of:

location information of the at least one target terminal,

SL-PRS measurement information of the at least one target terminal, type information of the at least one target terminal, expected angle of departure (AOD) information corresponding to a target terminal, or expected angle of arrival (AOA) information corresponding to the target terminal, wherein the location information comprises at least one of: absolute location information, relative location information, trajectory information, path information, speed information, or acceleration information;

the SL-PRS measurement information comprises at least one of: reference signal received power (RSRP) measurement information, reference signal time difference measurement information, receive-transmit time difference measurement information, arrival time measurement information, reference signal recognition information, reference signal received power information, angle measurement information, or transmission reception point identification information; and the type information is used to indicate any one of following: whether the target terminal supports the SL-PRS, or whether the target terminal supports an SL positioning method, or whether the target terminal is indicated as a road side unit (RSU) device, and whether the target terminal is a terminal of a specific type or a common terminal.

11. The method according to claim 2, wherein the SL-PRS measurement reporting or feedback information comprises at least one of:

recognition information of a first target terminal, recognition information of a second target terminal, location information of the second target terminal; or the SL-PRS measurement information, wherein the SL-PRS measurement information comprises at least one of: reference signal received power (RSRP) measurement information, reference signal time difference measurement information, receive-transmit time difference measurement information, arrival time measurement information, reference signal recognition information, reference signal received power information, angle measurement information, or transmission reception point identification information;

the location information comprises at least one of: absolute location information, relative location information, trajectory information, path information, speed information, or acceleration information; wherein the first target terminal is any one of following: the first terminal, the second terminal, and a third terminal, and the second target terminal is any one of following: the first terminal, the second terminal, and the third terminal.

12. The method according to claim 2, wherein the positioning response comprises at least one of:

error indication information, error type information, no available resource information, error cause information, acknowledgment (ACK) information, negative acknowledgment (NACK) information, information of not supporting on-demand selection of a positioning reference signal (PRS), identification information of at least one SL-PRS configuration set, request success indication information or request failure indication information, configuration success indication information or configuration failure indication information, a configuration parameter of an SL-PRS in the at least one SL-PRS configuration set, recognition information of a first target terminal, recognition information of a second target terminal, a region identifier, a communication range, a positioning range, quality of service (QoS) information related to positioning, a time-frequency resource for sending the SL-PRS, or a time-frequency resource for reporting or feeding back SL-PRS measurement; wherein the first target terminal is any one of following: the first terminal, the second terminal, and a third terminal, and the second target terminal is any one of following: the first terminal, the second terminal, and the third terminal;

or, the capability information comprises at least one of:

a capability of processing an SL-PRS; or a capability of an SL positioning method, wherein the capability of processing the SL-PRS comprises at least one of: a capability of simultaneously processing the SL-PRS and a downlink (DL) PRS, a capability of simultaneously processing the SL-PRS and a uplink (UL) PRS, an SL-PRS buffer type, a frequency band supported by the SL-PRS, a number of frequency bands supported by the SL-PRS, a capability of supporting carrier aggregation, a maximum capability of processing the SL-PRS, duration of the SL-PRS, or a number of sent SL-PRSs;

the capability of the SL positioning method comprises at least one of: an SL-PRS measurement capability, a positioning mode, a multi-beam sending or measurement capability, quasi-co-location (QCL), a capability of a path loss reference signal, a capability of supporting multi-path measurement or reporting, or a capability of supporting first-path measurement or reporting; and the SL-PRS measurement capability comprises at least one of: a maximum number of measured transmit terminals or a number of measured frequency layers.

13. The method according to claim 1, wherein the target message comprises any one of following:

indication information indicating in-coverage; and indication information indicating out-of-coverage.

14. The method according to claim 1, wherein the transmission of the target message is further performed through one or more of following messages:

a physical sidelink shared channel (PSSCH);

a proximity communication long term evolution positioning protocol (PC5-LPP) message; and a proximity communication radio resource control (PC5-RRC) message; and wherein the time domain offset information further comprises at least one of:

offset information between SL-PRS measurement reporting or feedback and the SL-PRS;

offset information between location information reporting or feedback and the SL-PRS;

offset information between the positioning request and the SL-PRS;

offset information between the positioning request and the SL-PRS measurement reporting or feedback;

offset information between the SCI and the SL-PRS measurement reporting or feedback;

offset information between the SCI and the location information reporting or feedback; or offset information between the SCI and the positioning request.

15. The method according to claim 1, wherein the performing, by a first terminal, transmission of a target message with a target device comprises:

sending, by the first terminal, the target message to the target device; and the method further comprises:

receiving, by the first terminal, a first message before sending the target message; and/or receiving, by the first terminal, a second message after sending the target message;

wherein the target message comprises the positioning request;

the first message comprises the positioning assistance data or a positioning response; and the second message comprises configuration information of a target SL-PRS or activation information of the target SL-PRS.

16. The method according to claim 1, wherein the performing, by a first terminal, transmission of a target message with a target device comprises:

receiving, by the first terminal, the target message from the target device; and the method further comprises:

receiving, by the first terminal, a third message before receiving the target message; and/or receiving, by the first terminal, a fourth message after receiving the target message;

wherein the target message comprises the positioning request;

the third message comprises the positioning assistance data; and the fourth message comprises a positioning response, wherein in a case that the positioning request comprises an SL-PRS measurement or reporting request, the positioning response comprises a time-frequency resource for SL-PRS measurement reporting or feedback of the SL-PRS;

in a case that the positioning request comprises a location information reporting or feedback request, the positioning response comprises location information of a target terminal;

in a case that the positioning request comprises an SL-PRS measurement reporting or feedback request, the positioning response comprises measurement information of the target terminal; and the target terminal is any one of following: the first terminal, the second terminal, and a third terminal.

17. A terminal, being a first terminal, comprising a processor, a memory, and a program or instructions stored in the memory and executable on the processor, wherein the program or instructions, when executed by the processor, cause the first terminal to perform:

performing transmission of a target message with a target device; and performing transmission of a first sidelink positioning reference signal (SL-PRS) based on the target message, wherein the target message comprises at least one of: a positioning request or positioning assistance data;

the first SL-PRS is used for determining: location information of the first terminal and/or a second terminal, and/or SL-PRS measurement information;

the second terminal is a peer terminal that performs sidelink (SL) communication or SL positioning with the first terminal, and the target device is the second terminal;

the target message comprises time domain offset information which is offset information between sidelink control information (SCI) and an SL-PRS; and the transmission of the target message is performed through the SCI, wherein the SCI is dedicated to scheduling of the SL-PRS.

18. The first terminal according to claim 17, wherein the target message further comprises at least one of: location reporting or feedback information, SL-PRS measurement reporting or feedback information, a positioning response, or capability information.

19. The first terminal according to claim 17, wherein the positioning request comprises at least one of:

a positioning assistance data request, a measurement request, a location information reporting or feedback request, an SL-PRS measurement reporting or feedback request, a configuration request for at least one SL-PRS, SL-PRS request indication information, or feedback indication information for a measurement request, wherein the positioning assistance data request is used for requesting the positioning assistance data;

the measurement request is used for requesting a device to measure the first SL-PRS;

the location information reporting or feedback request is used for: requesting a device to report or feed back a resource of location information, or requesting a device to report or feed back the location information;

the SL-PRS measurement reporting or feedback request is used for: requesting a device to report or feed back a resource of SL-PRS measurement information, or requesting a device to report or feed back the SL-PRS measurement information;

the configuration request is used for requesting configuration or transmission of the at least one SL-PRS;

the SL-PRS request indication information is used to indicate whether to request for the SL-PRS; and the feedback indication information for a measurement request is used to indicate that the first SL-PRS is received, and/or indicate whether the device requested by the measurement request sends feedback information, wherein the feedback information comprises at least one of: the location information, the SL-PRS measurement information, or hybrid automatic repeat request (HARQ) information.

20. A non-transitory readable storage medium, storing a program or instructions, wherein the program or instructions, when executed by a processor of a first terminal, cause the first terminal to perform:

performing transmission of a target message with a target device; and performing transmission of a first sidelink positioning reference signal (SL-PRS) based on the target message, wherein the target message comprises at least one of: a positioning request or positioning assistance data;

the first SL-PRS is used for determining: location information of the first terminal and/or a second terminal, and/or SL-PRS measurement information;

the second terminal is a peer terminal that performs sidelink (SL) communication or SL positioning with the first terminal, and the target device is the second terminal;

the target message comprises time domain offset information which is offset information between sidelink control information (SCI) and an SL-PRS; and the transmission of the target message is performed through the SCI, wherein the SCI is dedicated to scheduling of the SL-PRS.

* * * * *